(12) United States Patent
Zhang et al.

(10) Patent No.: US 11,200,727 B2
(45) Date of Patent: Dec. 14, 2021

(54) METHOD AND SYSTEM FOR FUSING IMAGE DATA

(71) Applicant: SHANGHAI UNITED IMAGING HEALTHCARE CO., LTD., Shanghai (CN)

(72) Inventors: Pian Zhang, Shanghai (CN); Jun Wan, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

(21) Appl. No.: 17/140,152

(22) Filed: Jan. 4, 2021

(65) Prior Publication Data

US 2021/0158604 A1 May 27, 2021

Related U.S. Application Data

(63) Continuation of application No. 16/455,708, filed on Jun. 27, 2019, now Pat. No. 10,885,700.

(30) Foreign Application Priority Data

Jun. 27, 2018 (CN) .......................... 201810677958.2

(51) Int. Cl.
*G06T 15/08* (2011.01)
*G06T 7/33* (2017.01)
(Continued)

(52) U.S. Cl.
CPC ................ *G06T 15/08* (2013.01); *G06T 7/33* (2017.01); *G06T 15/06* (2013.01); *G06T 15/503* (2013.01);
(Continued)

(58) Field of Classification Search
CPC ........... G06T 15/08; G06T 7/33; G06T 15/06; G06T 15/503; G06T 2207/10081; G06T 2207/10088
See application file for complete search history.

(56) References Cited

U.S. PATENT DOCUMENTS 6,480,732 B1  11/2002 Tanaka et al.
7,889,194 B2   2/2011 Engel et al.
(Continued)

FOREIGN PATENT DOCUMENTS

CN   102104784 A   6/2011
CN   102903141 A   1/2013
(Continued)

OTHER PUBLICATIONS

Liu, Bin et al., Research of X-Ray Automatic Image Mosaic Method, MIPPR 2013: Parallel Processing of Images and Optimization and Medical Imaging Processing, 2013, 7 pages.
(Continued)

*Primary Examiner* — Sarah Lhymn
(74) *Attorney, Agent, or Firm* — Metis IP LLC

(57) ABSTRACT

A method and system for fusing image data. The method may include obtaining a first volume image and a second volume image. The method may further include casting a plurality of rays through at least one of the first volume image or the second volume image. Each of the plurality of rays may correspond to a pixel of an image to be displayed. For each of at least a portion of the plurality of rays, the at least one processor may further be directed to cause the system to set a series of sampling positions along the ray. The method may further include selecting a reference position from the series of sampling positions. The method may further include determining fusion data of the ray. The method may further include determining a pixel value of a
(Continued)

pixel of the image to be displayed that corresponds to the ray.

20 Claims, 14 Drawing Sheets

(51) Int. Cl.
*G06T 15/06* (2011.01)
*G06T 15/50* (2011.01)

(52) U.S. Cl.
CPC ............... *G06T 2207/10081* (2013.01); *G06T 2207/10088* (2013.01); *G06T 2207/10104* (2013.01); *G06T 2207/20221* (2013.01); *G06T 2210/41* (2013.01)

(56) References Cited

U.S. PATENT DOCUMENTS

| | | |
|---|---|---|
| 2003/0233039 A1 | 12/2003 | Shao et al. |
| 2005/0175143 A1 | 8/2005 | Miyazaki et al. |
| 2006/0256111 A1 | 11/2006 | Chihoub et al. |
| 2007/0098299 A1 | 5/2007 | Matsumoto |
| 2014/0294266 A1 | 10/2014 | Eichhorn et al. |
| 2015/0022523 A1 | 1/2015 | Murray et al. |
| 2015/0199585 A1 | 7/2015 | Oh et al. |
| 2015/0325012 A1 | 11/2015 | Kojima et al. |
| 2016/0005218 A1 | 1/2016 | Day et al. |
| 2016/0269723 A1* | 9/2016 | Zhou ....................... G06T 5/002 |
| 2016/0350963 A1 | 12/2016 | Petkov et al. |
| 2017/0200317 A1 | 7/2017 | Hannemann et al. |
| 2017/0236324 A1* | 8/2017 | Yu ........................... G06T 15/08 382/131 |
| 2017/0285218 A1 | 10/2017 | Zhang et al. |
| 2018/0357814 A1* | 12/2018 | Bohn ..................... G06T 15/005 |
| 2019/0000588 A1 | 1/2019 | Choudhry et al. |
| 2019/0221027 A1* | 7/2019 | Petkov .................. G06T 15/503 |
| 2019/0336033 A1 | 11/2019 | Takeshima |

FOREIGN PATENT DOCUMENTS

| | | |
|---|---|---|
| CN | 103366394 A | 10/2013 |
| CN | 103745495 A | 4/2014 |
| CN | 104394309 A | 3/2015 |
| CN | 104851095 A | 8/2015 |
| CN | 106408643 A | 2/2017 |

OTHER PUBLICATIONS

Zhu, Zhengrong, Design and Application of Medical Image Registration System Based on ITK, Chinese Master's Theses Full-text Database, 2017, 74 pages.

Roger Bramon et al., Multimodal Data Fusion Based on Mutual information, IEEE, 18(9): 1574-1587, 2012.

First Office Action in Chinese Application No. 201810677958.2 dated Nov. 4, 2020, 9 pages.

\* cited by examiner

900

```
┌─────────────────────────────────────┐
│ Calculating the maximum gray value  │
│ (denoted as Max gray), the          │
│ corresponding position              │
│ (denoted as MaxStep), and the       │─ 910
│ sampling color (denoted as          │
│ SampleColor) of the maximum         │
│ density projection                  │
└─────────────────────────────────────┘
                   │
                   ▼
┌─────────────────────────────────────┐
│ Sampling from the start point to    │
│ MaxStep to obtain a sampling color  │
│ (denoted as vecSampleColor) which   │
│ may be fused with the               │─ 920
│ SampleColor of the maximum density  │
│ projection and further assigning    │
│ the fusion result to vecSampleColor │
└─────────────────────────────────────┘
                   │
                   ▼
┌─────────────────────────────────────┐
│ Sampling, for the volume rendering  │
│ image, from the positon             │
│ corresponding to the first voxel    │
│ next to the MaxStep (denoted as     │
│ MaxStep+1) to the ending position   │─ 930
│ MaxStep (denoted as EndStep) of     │
│ the ray, wherein the results of     │
│ each sampling steps may be fused    │
│ with vecSampleColor, and the fusion │
│ result may be assigned as           │
│ vecSampleColor                      │
└─────────────────────────────────────┘
```

METHOD AND SYSTEM FOR FUSING IMAGE DATA

CROSS REFERENCE TO RELATED APPLICATIONS

This application is a continuation of U.S. application Ser. No. 16/455,708, filed on Jun. 27, 2019, which in turn claims priority of Chinese Patent Application No. 201810677958.2 filed on Jun. 27, 2018, the contents of which are hereby incorporated by reference.

TECHNICAL FIELD

The present disclosure generally relates to a method and system for image processing, and more particularly to systems and methods for fusing image data.

BACKGROUND

In clinical applications, medical imaging plays an impotent role for providing anatomical information of a patient. However, the information provided by single-modality medical images (e.g., a computed tomography (CT) image, a positron emission computed tomography (PET) images, a magnetic resonance (MR) image), may be insufficient for an intended purpose, e.g., diagnosis, treatment planning or execution. In such a situation, a fused medical image of different modalities may provide more accurate and comprehensive anatomical and/or functional information of, e.g., a lesion, thereby facilitating a doctor to make an accurate diagnosis, to develop a suitable treatment plan, and/or to execute a treatment plan.

An image fusion is proposed in the art for generating a multi-modality image based on multiple single-modality medical images, which may include obtaining single-modality images of a same target that are acquired by imaging devices of a same or different sources (e.g., a same or different modalities), and processing the multiple single-modality images to extract useful information therefrom and integrating the extracted information into a same image for viewing and/or further processing. A fused mono-modality or multi-modality image may have a superior performance over the single-modality images on the basis of which the fused image is generated. According to the imaging modalities of images subjected to the image fusion, approaches for performing an image fusion may include, e.g., a mono-modality image fusion approach and a multi-modality image fusion approach. A mono-modality image fusion approach may refer to a fusion of images of the same imaging modality, such as an image fusion of single-photon emission computed tomography (SPECT) images, an image fusion of MR images, etc. A multi-modality image fusion approach may refer to an image fusion performed on images of different imaging modalities, such as an image fusion of a SPECT image and an MR image, an image fusion of a PET image and a CT image.

In the art, an image fusion performed on a PET image obtained via a maximum intensity projection (MIP) and a CT image obtained via a volume rendering (VolRen) is generally performed by fusing each two-dimensional MIP image of the PET image (including a plurality of the two dimensional MIP image) and the corresponding two-dimensional VolRen image of the CT image (including a plurality of two-dimensional VolRen images) in an image-by-image manner. However, via such an approach, it is difficult to accurately represent depth information of tissue in the MIP image, and the obtained fused image may represent the scanned portion of the patient inaccurately. As a result, the analysis and diagnosis based on the fused image may be negatively influenced.

Therefore, it is desirable to provide a method and system for generating a fusion image (or referred to as a fused image) providing depth information.

SUMMARY

According to an aspect of the present disclosure, a system is provided. The system may include at least one storage medium storing a set of instructions and at least one processor configured to communicate with the at least one storage medium. When executing the set of instructions, the at least one processor may be directed to cause the system to obtain a first volume image and a second volume image. The first volume image may include a plurality of first voxels. The second volume image may include a plurality of second voxels. The at least one processor may also be directed to cause the system to cast a plurality of rays through at least one of the first volume image or the second volume image. Each of the plurality of rays may correspond to a pixel of an image to be displayed. For each of at least a portion of the plurality of rays, the at least one processor may further be directed to cause the system to set a series of sampling positions along the ray. The at least one processor may further be directed to cause the system to select, based on voxel values of the first voxels along the ray, a reference position from the series of sampling positions. The at least one processor may further be directed to cause the system to determine, based on a voxel value of at least one first voxel corresponding to the reference position and voxel values of second voxels corresponding to at least some of the series of sampling positions, fusion data of the ray. The at least one processor may further be directed to cause the system to determine, based at least in part on the fusion data of the ray, a pixel value of a pixel of the image to be displayed that corresponds to the ray.

In some embodiments, to select, based on voxel values of the first voxels along the ray, a reference position from the series of sampling positions, the at least one processor may further be directed to cause the system to determine a reference voxel. The reference voxel may be the first voxel that has a highest voxel value among the first voxels along the ray. The at least one processor may further be directed to cause the system to designate the sampling position corresponding to the reference voxel as the reference position.

In some embodiments, the series of sampling positions may include a start sampling position and an end sampling position. To determine, based on a voxel value of at least one first voxel corresponding to the reference position and voxel values of second voxels corresponding to at least some of the series of sampling positions, fusion data of the ray, the at least one processor may further be directed to cause the system to determine, based on the voxel value of the at least one first voxel corresponding to the reference position and the voxel values of the second voxels corresponding to sampling positions from the start sampling position to the end sampling position, the fusion data of the ray.

In some embodiments, to determine, based on the voxel value of the at least one first voxel corresponding to the reference position and the voxel values of the second voxels corresponding to sampling positions from the start sampling position to the end sampling position, the fusion data of the ray, the at least one processor may further directed to cause the system to obtain, at the reference position, a first sampling value based on the voxel value of the at least one first voxel corresponding to the reference position. The at least one processor may further directed to cause the system to obtain, at each sampling position from the start sampling position to the end sampling position, a second sampling value based on the voxel value of at least one second voxel corresponding to the sampling position, thereby obtaining a plurality of second sampling values. The at least one processor may further directed to cause the system to determine, based on the first sampling value and the plurality of second sampling values, the fusion data of the ray.

In some embodiments, the first sampling value may be obtained by performing an interpolation or extrapolation on the voxel value of the at least one first voxel corresponding to the reference position. The second sampling value may be obtained by performing an interpolation or extrapolation on the voxel value of the at least one second voxel corresponding to the sampling position.

In some embodiments, to determine, based on the first sampling value and the plurality of second sampling values, the fusion data of the ray, the at least one processor may further be directed to cause the system to designate the second sampling value of the start sampling position as a first preliminary value. The at least one processor may further be directed to cause the system to obtain a second preliminary value by updating, for each sampling position from the sampling position next to the start sampling position to the reference position and based at least in part on the second sampling value of the sampling position, the first preliminary value. The at least one processor may further be directed to cause the system to obtain a third preliminary value by updating the second preliminary value based on the first sampling value. The at least one processor may further be directed to cause the system to obtain the fusion data of the ray by updating, for each sampling position from the sampling position next to the reference position to the end sampling position and based at least in part on the second sampling value of the sampling position, the third preliminary value.

In some embodiments, the obtaining a second preliminary value by updating, for each sampling position from the sampling position next to the start sampling position to the reference position and based at least in part on the second sampling value of the sampling position, the first preliminary value may include combining a current first preliminary value and the second sampling value using an alpha blending technique. The obtaining a third preliminary value by updating the second preliminary value based on the first sampling value may include combining the second preliminary value and the first sampling value using the alpha blending technique. The obtaining the fusion data of the ray by updating, for each sampling position from the sampling position next to the reference position to the end sampling position and based at least in part on the second sampling value of the sampling position, the third preliminary value may include combining a current third preliminary value and the second sampling value using the alpha blending technique.

In some embodiments, to obtain a first volume image and a second volume image, the at least one processor may be further directed to cause the system to perform an image registration between the first volume image and the second volume image, wherein the first volume image and the second volume image include image regions corresponding to a same object.

In some embodiments, to determine, based at least in part on the fusion data of the ray, a pixel value of a pixel of the image to be displayed that corresponds to the ray may be based on a volume rendering technique.

In some embodiments, to determine, based at least in part on the fusion data of the ray, a pixel value of a pixel of the image to be displayed that corresponds to the ray, the at least one processor may be directed to cause the system to perform a window width adjustment or a window level adjustment on the fusion data of the ray.

In some embodiments, the first volume image may be obtained via a maximum intensity projection (MIP) technique.

In some embodiments, the first volume image may be a positron emission computed tomography (PET) image. The second volume image may be a computed tomography (CT) image or a magnetic resonance (MR) image.

According to another aspect of the present disclosure, a method is provided. The method may include obtaining a first volume image and a second volume image. The first volume image may include a plurality of first voxels. The second volume image may include a plurality of second voxels. The method may further include casting a plurality of rays through at least one of the first volume image or the second volume image. Each of the plurality of rays may correspond to a pixel of an image to be displayed. For each of at least a portion of the plurality of rays, the at least one processor may further be directed to cause the system to set a series of sampling positions along the ray. The method may further include selecting, based on voxel values of the first voxels along the ray, a reference position from the series of sampling positions. The method may further include determining, based on a voxel value of at least one first voxel corresponding to the reference position and voxel values of second voxels corresponding to at least some of the series of sampling positions, fusion data of the ray. The method may further include determining, based at least in part on the fusion data of the ray, a pixel value of a pixel of the image to be displayed that corresponds to the ray.

According to still a further aspect of the present disclosure, a non-transitory computer readable medium is provided. The non-transitory computer readable medium storing instructions, the instructions, when executed by a computer, may cause the computer to implement a method. The method may include one or more of the following operations. The method may include obtaining a first volume image and a second volume image. The first volume image may include a plurality of first voxels. The second volume image may include a plurality of second voxels. The method may further include casting a plurality of rays through at least one of the first volume image or the second volume image. Each of the plurality of rays may correspond to a pixel of an image to be displayed. For each of at least a portion of the plurality of rays, the at least one processor may further be directed to cause the system to set a series of sampling positions along the ray. The method may further include selecting, based on voxel values of the first voxels along the ray, a reference position from the series of sampling positions. The method may further include determining, based on a voxel value of at least one first voxel corresponding to the reference position and voxel values of second voxels corresponding to at least some of the series of sampling positions, fusion data of the ray. The method may further include determining, based at least in part on the fusion data of the ray, a pixel value of a pixel of the image to be displayed that corresponds to the ray.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating another exemplary process for image fusion according to some embodiments of the present disclosure;

DETAILED DESCRIPTION

Figure 1:
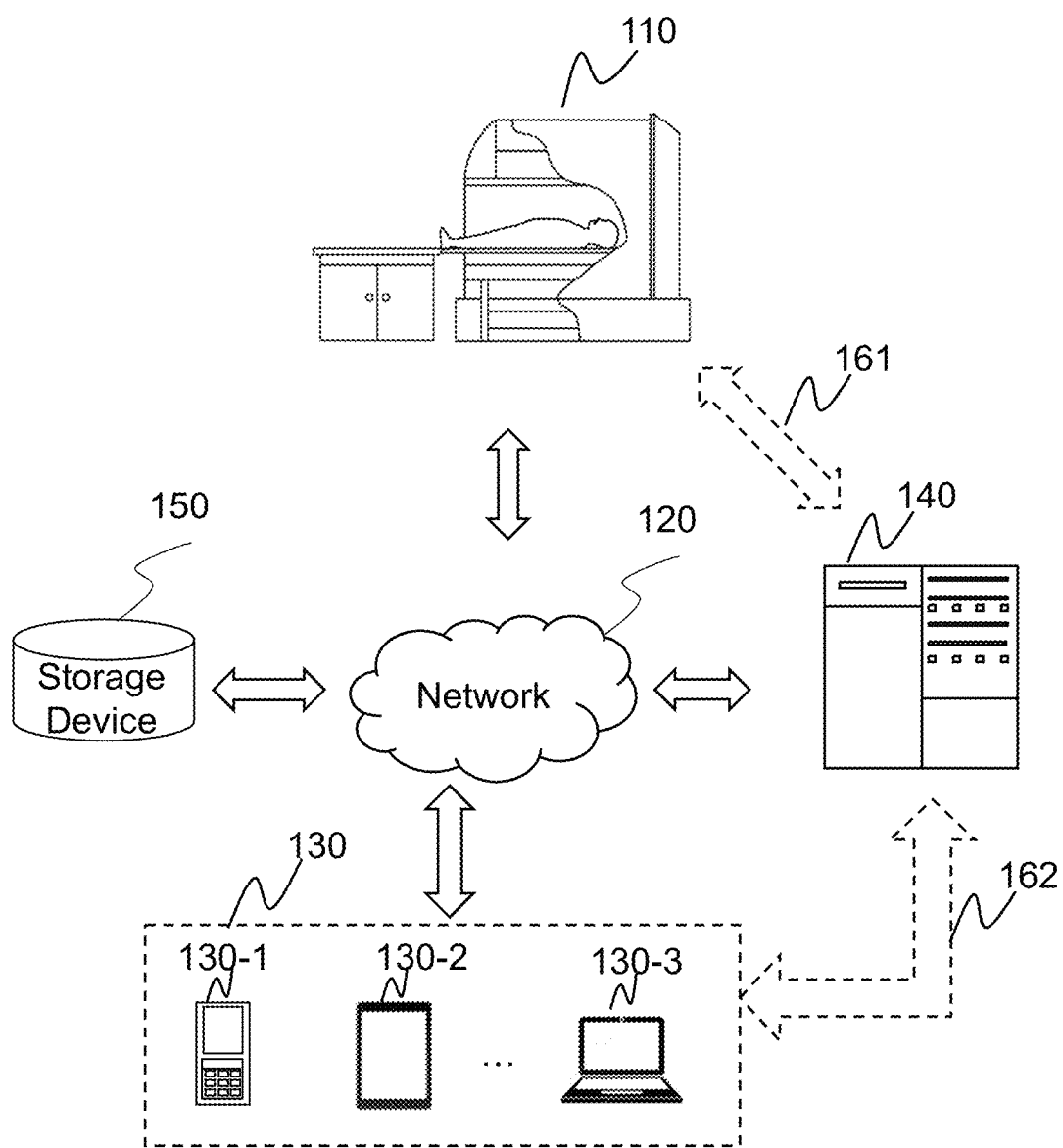
FIG. 1 is a schematic diagram illustrating an exemplary system according to some embodiments of the present disclosure.

The present disclosure is directed to a method and system for performing an image fusion of different images to obtain a fused image. For example, the fused image may be used for a treatment of a disease, a diagnosis of a disease, a synchronous motion control, a research, etc. In some embodiments, the image fusion may be performed for generating a fused medical image to provide more accurate anatomical information of a patient. For example, the image fusion may be performed on a first volume image (e.g., a PET image via an MIP approach) and a second volume image (e.g., a CT image or an MR image). During the image fusion, a plurality of rays may be casted through at least one of the first volume image or the second volume image. Each of the plurality of rays may correspond to a pixel of a fused image. Fusion data may be obtained for each of the plurality of rays, and based on the fusion data, a pixel value of a corresponding pixel (e.g., the color of a pixel, the gray value of a pixel) of the fused image may be determined. For each of the plurality of rays, voxels of the first volume image and voxels of the second volume image that are along the ray may be selectively used to obtain the corresponding fusion data, so as to improve the accuracy of the depth information in the fused image. The fused image with improved depth information may simplify, and/or improve the efficiency and/or the accuracy of a diagnosis performed based on the fused image.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the," may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 2:
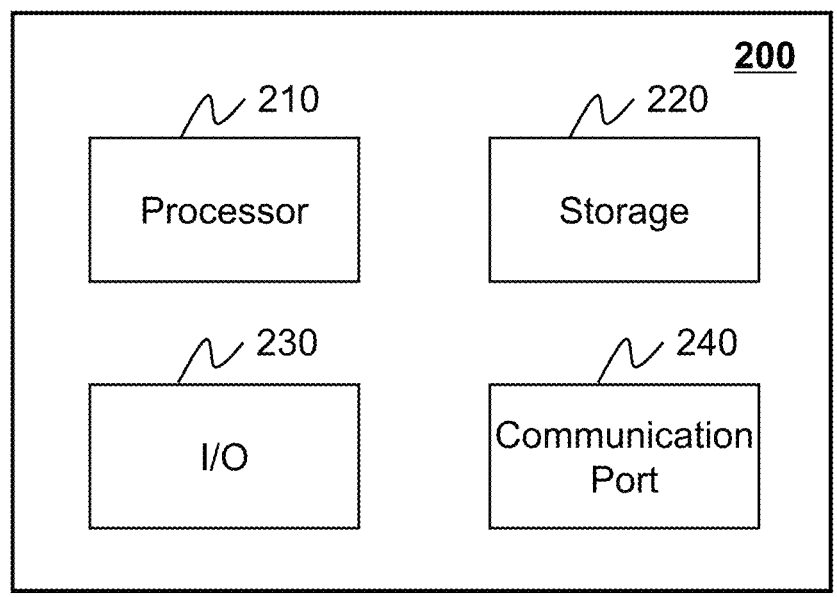
FIG. 2 is a schematic diagram illustrating exemplary hardware and/or software components of an exemplary computing device according to some embodiments of the present disclosure.

Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary system according to some embodiments of the present disclosure. As shown in FIG. 1, the system 100 may include an apparatus 110, a network 120, one or more terminals 130, a processing device 140, and a storage device 150. The components in the system 100 may be connected in various ways. In some embodiments, the apparatus 110 may be connected to the processing device 140 through the network 120. In some embodiments, the apparatus 110 may be connected to the processing device 140 directly as indicated by the bi-directional broken arrow 161. In some embodiments, the storage device 150 may be connected to the processing device 140 directly or through the network 120. In some embodiments, the terminal 130 may be connected to the processing device 140 directly as indicated by the bi-directional broken arrow 162 or through the network 120.

In some embodiments, the apparatus 110 may be an RT device. In some embodiments, the RT device may deliver a radiation beam to an object (e.g., a patient, or a phantom) or a portion thereof. In some embodiments, the RT device may include a linear accelerator (also referred to as "linac"). The linac may generate and emit a radiation beam (e.g., an X-ray beam) from a treatment head. The radiation beam may pass through one or more collimators (e.g., a multi-leaf collimator (MLC)) of certain shapes, and enter into the object. In some embodiments, the radiation beam may include electrons, photons, or other types of radiation. In some embodiments, the energy of the radiation beam may be in the megavoltage range (e.g., >1 MeV), and may therefore be referred to as a megavoltage beam. The treatment head may be coupled to a gantry. The gantry may rotate, for example, clockwise or counter-clockwise around a gantry rotation axis. In some embodiments, the treatment head may rotate along with the gantry. In some embodiments, the RT device may include a table configured to support the object during radiation treatment.

In some embodiments, the apparatus 110 may be an imaging device. The imaging device may generate or provide image(s) by scanning an object or a part thereof. In some embodiments, the imaging device may be a medical imaging device, for example, a positron emission tomography (PET) device, a single-photon emission computed tomography (SPECT) device, a computed tomography (CT) device, a magnetic resonance imaging (MRI) device, an ultrasonography device, an X-ray photography device, or the like, or any combination thereof. In some embodiments, the imaging device may include a gantry to support one or more imaging components configured to imaging the object, and/or a table configured to support the object during an imaging process. In some embodiments, the imaging device may include a single-modality scanner. The single-modality scanner may include an MRI scanner, a CT scanner, a PET scanner, or the like, or any combination thereof. In some embodiments, the imaging device may include a multi-modality scanner. The multi-modality scanner may include a positron emission tomography-computed tomography (PET-CT) scanner, a positron emission tomography-magnetic resonance imaging (PET-MRI) scanner, or the like, or any combination thereof. In some embodiments, the imaging device may transmit the image(s) via the network 120 to the processing device 140, the storage device 150, and/or the terminal(s) 130. For example, the image(s) may be sent to the processing device 140 for further processing or may be stored in the storage device 150.

In some embodiments, the apparatus 110 may be an integrated device of an imaging device and an RT device. In some embodiments, the apparatus 110 may include one or more surgical instruments. In some embodiments, the apparatus 110 may include an operating table (or table for brevity) configured to support an object during surgery. The table may support an object during a treatment process or imaging process, and/or support a phantom during a correction process of the apparatus 110. The table may be adjustable and/or movable to suit for different application scenarios.

In some embodiments, the object to be treated or scanned (also referred to as imaged) may include a body, substance, or the like, or any combination thereof. In some embodiments, the object may include a specific portion of a body, such as a head, a thorax, an abdomen, or the like, or any combination thereof. In some embodiments, the object may include a specific organ, such as a breast, an esophagus, a trachea, a bronchus, a stomach, a gallbladder, a small intestine, a colon, a bladder, a ureter, a uterus, a fallopian tube, etc. In the present disclosure, "object" and "subject" are used interchangeably.

The network 120 may include any suitable network that can facilitate exchange of information and/or data for the system 100. In some embodiments, one or more components of the system 100 (e.g., the apparatus 110, the terminal 130, the processing device 140, the storage device 150) may communicate information and/or data with one or more other components of the system 100 via the network 120. For example, the processing device 140 may obtain one or more instructions from the terminal 130 via the network 120. As another example, the processing device 140 may obtain one or more images and/or image data (e.g., volume images and/or volume image data) from the apparatus 110 or the storage device 150 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the system 100 may be connected to the network 120 to exchange data and/or information.

Figure 3:
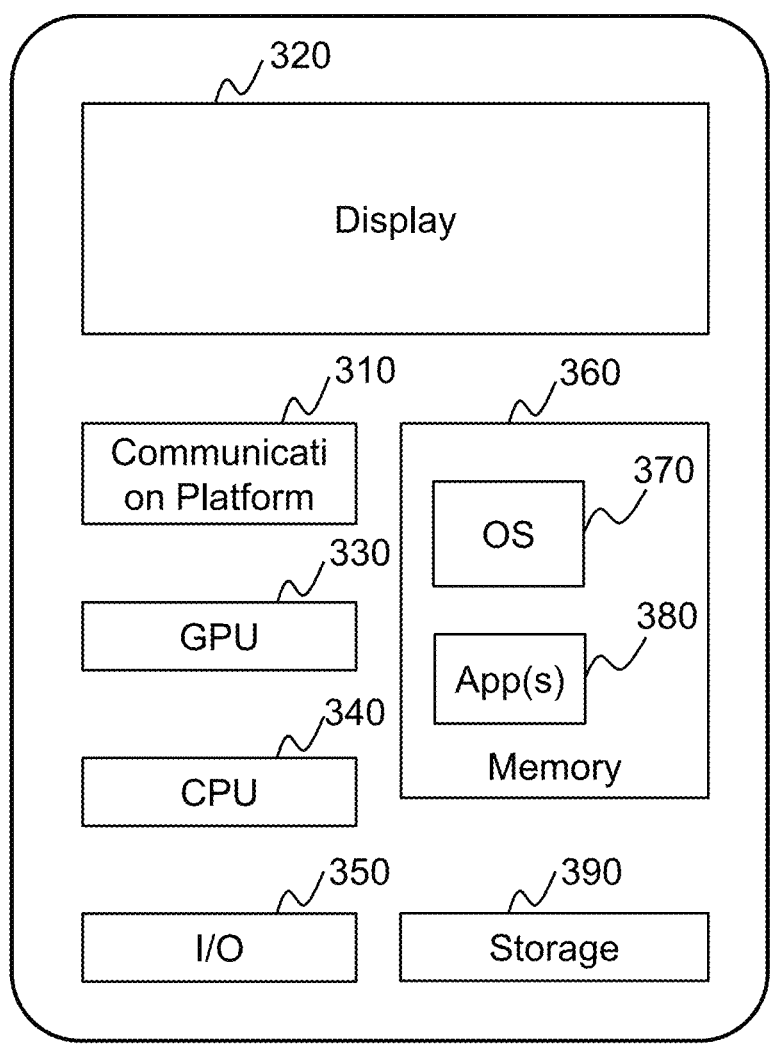
FIG. 3 is a schematic diagram illustrating exemplary hardware and/or software components of an exemplary mobile device according to some embodiments of the present disclosure.

The terminal(s) 130 may enable interactions between a user and the system 100. The terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. Merely by way of example, the terminal 130 may include a mobile device as illustrated in FIG. 3. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing device 140.

The processing device 140 may process data and/or information obtained from the apparatus 110, the terminal 130, and/or the storage device 150. For example, the processing device 140 may obtain one or more volume image and/or volume image data. As another example, the processing device 140 may obtain a registration result by registering the one or more volume image and/or volume image data. As still another example, the processing device 140 may cast a plurality of rays through the one or more volume image and/or volume image data to obtain fusion data. As a further example, the processing device 140 may generate an image to be displayed based on the fusion data In some embodiments, the processing device 140 may be a computer, a user console, a single server or a server group, etc. The server group may be centralized or distributed. In some embodiments, the processing device 140 may be local or remote. For example, the processing device 140 may access information and/or data stored in the apparatus 110, the terminal 130, and/or the storage device 150 via the network 120. As another example, the processing device 140 may be directly connected to the apparatus 110, the terminal 130, and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2.

The storage device 150 may store data, instructions, and/or any other information. In some embodiments, the storage device 150 may store data obtained from the apparatus 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the system 100 (e.g., the processing device 140, the terminal 130, etc.). One or more components in the system 100 may access the data or instructions stored in the storage device 150 via the network 120. In some embodiments, the storage device 150 may be directly connected to or communicate with one or more other components in the system 100 (e.g., the processing device 140, the terminal 130, etc.). In some embodiments, the storage device 150 may be part of the processing device 140. In some embodiments, the processing device 140 may be connected to or communicate with the apparatus 110 via the network 120, or at the backend of the processing device 140.

FIG. 2 is a schematic diagram illustrating exemplary hardware and/or software components of an exemplary computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image(s) obtained from the apparatus 110, the terminal 130, the storage device 150, and/or any other component of the system 100. In some embodiments, the processor 210 may process the image(s) based on information relating to a treatment plan. The treatment plan may be obtained from a treatment planning system (TPS) associated with the system 100. The information relating to the treatment plan may include preoperative medical image(s) representing the internal anatomical information of an object to be treated or imaged. In some embodiments, the processor 210 may generate augmented reality (AR) image(s) based on the image(s) or information obtained from the terminal 130, the storage device 150, and/or any other component of the system 100. The AR image(s) may represent the external surface information of the object and/or the internal anatomical information of the object. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the apparatus 110, the terminal 130, the storage device 150, and/or any other component of the system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for fusing images.

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the apparatus 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

FIG. 3 is a schematic diagram illustrating exemplary hardware and/or software components of an exemplary mobile device on which the terminal 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
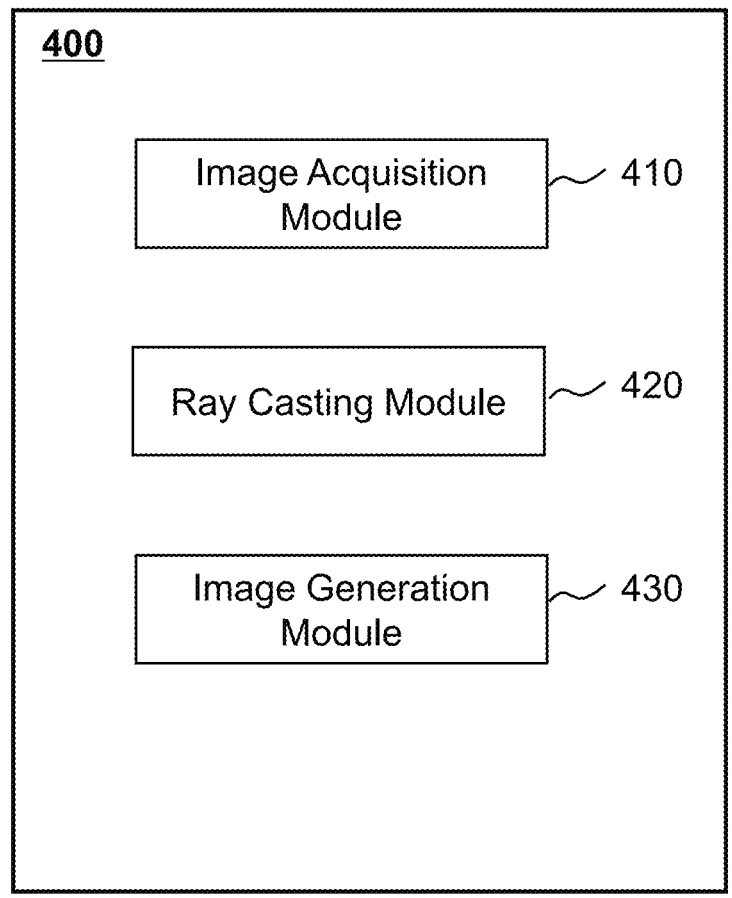
FIG. 4 is a block diagram illustrating an exemplary processing device 140 according to some embodiments of the present disclosure.

FIG. 4 is a block diagram illustrating an exemplary processing device 400 according to some embodiments of the present disclosure. The processing device 400 may be an example of the processing device 140 illustrated in FIG. 1. At least a portion of the processing device 400 may be implemented on the computing device 200 (e.g., the processor 210) illustrated in FIG. 2 or the mobile device 300 as illustrated in FIG. 3. The processing device 400 may include an image acquisition module 410, a ray casting module 420, and an image generation module 430.

The image acquisition module 410 may be configured to obtain a first volume image and a second volume image. The first volume image may include a plurality of first voxels, and the second volume image may include a plurality of second voxels. Some of the plurality of first voxels and the some of the plurality of second voxels may correspond to a same object (e.g., an organ). A voxel (e.g., a first voxel, a second voxel) may have at least one voxel value. The at least one voxel value of a voxel may include a color value and/or a transparency value to represent the color and/or the transparency of the voxel, respectively.

The ray casting module 420 may be configured to cast a plurality of rays through the first volume image and/or the second volume image. A ray may correspond to a pixel of a fused image. The ray casting module 420 may also be configured to obtain fusion data for a ray. At least a portion of the plurality of rays may pass through the volume of the first volume image and/or the volume of the second volume image.

The image generation module 430 may be configured to generate a fused image based on the fusion data. For each pixel of the fused image, the image generation module 430 may determine a corresponding pixel value based on the fusion data. Further, based on the plurality of pixels and the corresponding pixels values, the image generation module 430 may generate a fused image.

It is noted that the above descriptions about the processing device 400 are only for illustration purposes, and not intended to limit the present disclosure. It is understood that after learning the major concept and the mechanism of the present disclosure, a person of ordinary skill in the art may alter the processing device 400 in an uncreative manner. The alteration may include combining and/or splitting modules or units, adding or removing optional modules or units, etc. All such modifications are within the protection scope of the present disclosure.

Figure 5:
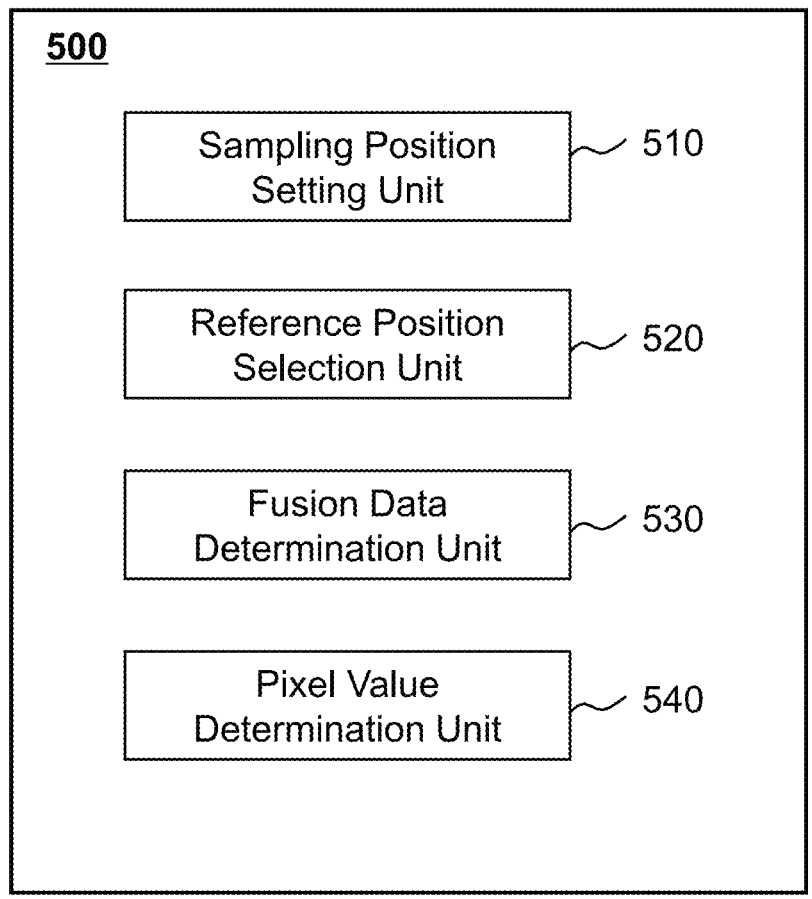
FIG. 5 is a block diagram illustrating an exemplary ray casting module 420 according to some embodiments of the present disclosure.

FIG. 5 is a block diagram illustrating an exemplary ray casting module 500 according to some embodiments of the present disclosure. The ray casting module 500 may be an example of the ray casting module 420 illustrated in FIG. 4. The ray casting module 500 may be implemented on the computing device 200 (e.g., the processor 210) illustrated in FIG. 2 or the mobile device 300 as illustrated in FIG. 3. The ray casting module 500 may include a sampling position setting unit 510, a reference position selection unit 520, a fusion data determination unit 530, and a pixel value determination unit 540.

The sampling position setting unit 510 may be configured to set a series of sampling positions (or sampling points) along a ray. The series of sampling positions of a ray may be determined from the origin of the ray or from the point (entering point) where the ray enters into the volume of the first/second volume image. The sampling position setting unit 510 may determine multiple sampling positions along the ray until the end of the ray, to the point (exiting point) where the ray exits the volume, or until a certain count of sampling positions have been determined.

The reference position selection unit 520 may be configured to select, based on voxel values of the first voxels along the ray, a reference position from the series of sampling positions. In some embodiment, the reference position selection unit 520 may first determine a reference voxel, and then designate the sampling position corresponding to the reference voxel as the reference position.

The fusion data determination unit 530 may be configured to determine, based on a voxel value of each of at least one first voxel corresponding to the reference position and voxel values of second voxels corresponding to at least some of the series of sampling positions, fusion data of the ray. In some embodiments, the voxel value of each first or second voxel may include one or more sub-values. In some embodiments, the voxel value may be represented as a vector including one or more elements. For instance, for an RGBA color space, the voxel value may be represented as a vector including three elements corresponding to the color channels Red, Green, and Blue.

The pixel value determination unit 540 may be configured to determine, based at least in part on the fusion data of the ray, a pixel value of a pixel of the fused image that corresponds to the ray. In some embodiments, the pixel value determination unit 540 may determine the pixel value of the pixel of the fused image based on a volume rendering technique. Exemplary volume rendering techniques may include a ray-casting algorithm, a shear-warp algorithm, a frequency domain algorithm, a splatting algorithm, or the like, or any combination thereof. In some embodiments, based on the determined pixels and a plurality preset parameters, the pixel value determination unit 540 may generate the fused image. In some embodiments, the fused image may be displayed on a display device (e.g., the display 320).

It is noted that the above descriptions about the processing device 400 and the ray casting module 500 are only for illustration purposes, and not intended to limit the present disclosure. It is understood that after learning the major concept and the mechanism of the present disclosure, a person of ordinary skill in the art may alter the processing device 400 and/or the ray casting module 500 in an uncreative manner. The alteration may include combining and/or splitting modules or units, adding or removing optional modules or units, etc. All such modifications are within the protection scope of the present disclosure.

Figure 6:
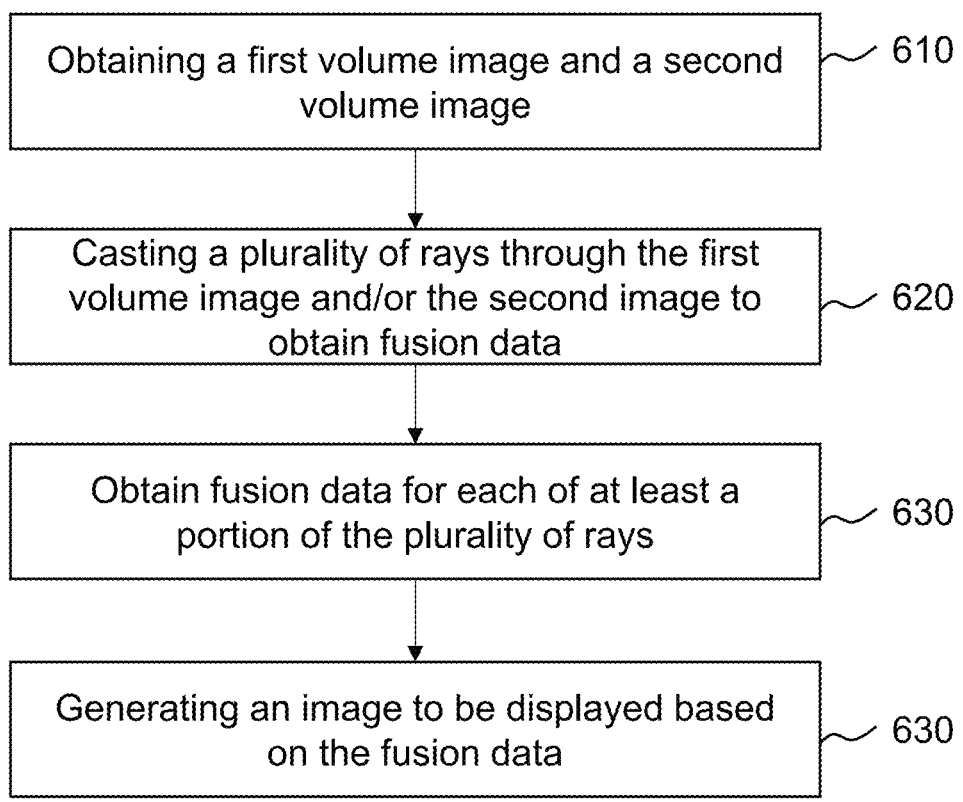
FIG. 6 is a flowchart illustrating an exemplary process for determining a fusion result of two volume image according to some embodiments of the present disclosure.

FIG. 6 is a flowchart illustrating an exemplary process 600 for generating an image to be displayed according to some embodiments of the present disclosure. The process 600 may be implemented by the processing device 400 illustrated in FIG. 4. In some embodiments, the process 600 illustrated in FIG. 6 may be implemented in the image processing system 100 illustrated in FIG. 1 (e.g., by the processing device 140). For example, the process 600 illustrated in FIG. 6 may be stored in a storage device (e.g., the storage device 150, the storage 220, a ROM, a RAM) in the form of instructions, and invoked and/or executed by one or more processors (e.g., the processor 210) of the processing device 140.

In 610, the processing device 140 (e.g., the image acquisition module 410) may obtain a first volume image and a second volume image. The first volume image may include a plurality of first voxels, and the second volume image may include a plurality of second voxels. Some of the plurality of first voxels and the some of the plurality of second voxels may correspond to a same object (e.g., an organ, a lesion). Each voxel (e.g., a first voxel, a second voxel) may include at least one voxel value. The at least one voxel value of a voxel may include a color value and/or a transparency value to represent the color and/or the transparency of the voxel, respectively. For example, the first volume image and/or the second volume image may adopt an RGBA color space, and the at least one voxel value may include four voxel values representing the four channels: Red (R), Green (G), Blue (B), and Alpha (A).

In some embodiments, the first volume image and the second volume image may be three-dimensional (3D) images and/or 3D data set representing the 3D images. The 3D data set may represent a scalar field acquired by a certain imaging scanner. Exemplary imaging scanners may include an X-ray scanner, a computed tomography (CT) scanner, a micro-CT scanner, a position emission tomography (PET) scanner, a magnetic resonance imaging (MRI) scanner, an ultrasound scanner, a bone densitometry scanner, or the like, or any combination thereof.

In some embodiments, the 3D images may be a reconstructed 3D image, such as a 3D PET image, a 3D CT image, a 3D MR image, a 3D ultrasound image, or the like, or a combination thereof. The 3D images may be generated based on a 3D reformation technique. Exemplary 3D reformation techniques may include a volume rendering (VR) technique, a maximum intensity projection (MIP) technique, a minimum intensity projection (MinIP) technique, an average intensity projection (AIP) technique, a surface shade display (SSD) technique, a virtual endoscopy (VE) technique, or the like, or any combination thereof. In some embodiments, the first volume image may be a 3D PET image generated based on the maximum intensity projection (MIP) technique, and the second volume image may be a 3D CT/MR image generated based on the volume rendering (VR) technique.

In some embodiments, the first volume image and the second volume image may be obtained from a same source, e.g., using a same multi-modality scanner to scan a same object (such as a patient) concurrently or sequentially. The first volume image and the second volume image may include image regions corresponding to the same object. In such a situation, the image spaces of the first volume image and the second volume image may both correspond to the scan space of the multi-modality imaging system. By performing an image matching operation with respect to the coordination systems of the first volume image and the second image, such as a translation operation, a rotation operation, and/or a scaling operation, the first volume image may match the second volume image, so as to establish a correspondence between first voxels and second voxels that represent same positions or elements (such as tissue, organs, tumors, etc., of a patient). In some embodiments, the first volume image and the second volume image may be generated directly with such a correspondence, and therefore the matching operation may be omitted. For example, the same coordinates in the coordinate system (e.g., a Cartesian coordinate system, a digital imaging and communications in medicine (DICOM) coordinate system) of the first volume image and the second volume image may directly represent the same position in the scan space of the multi-modality imaging system. In some embodiments, a patient may be scanned by a PET-CT imaging system including a PET scanner and a CT scanner. The first volume image may be a 3D PET image. The second volume image may be a 3D CT image.

In some embodiments, the first volume image and the second volume image may be obtained from different sources, e.g., using different single-modality scanners to scan a same object (or different objects (e.g., a first region of a patient scanned by one single-modality scanner only partially overlapping a second region of the patient scanned by another single-modality scanner). The first volume image and the second volume image may include image regions corresponding to the same portion of the object (such as a patient). In such a situation, an image registration operation may be performed to establish a correspondence between first voxels and second voxels that represent same positions or elements (such as tissues, organs, tumors, etc., of a patient). For example, a patient may be subject to a PET scan by a single-modality PET scanner in a PET scanning room and a CT scan by a single-modality CT scanner in a CT scanning room. The first volume image may be a 3D PET image. The second volume image may be a 3D CT image. However, the 3D PET image and 3D CT image may correspond to different scan spaces, i.e., the scan space of the single-modality PET scanner and the scan space of the single-modality CT scanner. In such a situation, an image registration operation may be performed on the 3D CT image and the 3D PET image. Merely as an example, the processor may outline a first contoured surface of the patient in the 3D PET image and a second contoured surface of the patient in the 3D CT image. Through the image registration, the first contoured surface in the 3D PET image may match the second contoured surface of the patient in the 3D CT image, and the first volume image and the second volume image may be positioned into the same coordinate system in which the corresponding portions overlap with each other.

In some embodiments, after the image registration operation or the image matching operation, the first volume image and the second volume image may at least partially overlap. For example, image portions (or voxels) of the first volume image and the second volume image representing a same object (e.g., an organ) may overlap after the image registration operation or the image matching operation.

In 620, the processing device 140 (e.g., the ray casting module 420) may cast a plurality of rays through the first volume image and/or the second volume image. A ray may correspond to a pixel of a fused image. In some embodiments, the plurality of rays may be parallel. Alternatively, the plurality of rays may be non-parallel (e.g., convergent) to achieve a desired effect (e.g., a desired display effect) of the fused image. Due to the location and shape of the first volume image and/or the second volume image, the location of the source of the plurality of rays (e.g., where the plurality of rays start), the directions of the plurality of rays, etc., one or more of the plurality of rays may be outside the volume of the first volume image and/or the second volume image. The pixels corresponding to such rays may form the background of the fused image.

In 630, the processing device 140 (e.g., the ray casting module 420) may obtain fusion data for each of at least a portion of the plurality of rays. The at least a portion of the plurality of rays may pass through the volume of the first volume image and/or the volume of the second volume image. In some embodiments, along at least a portion of the ray (e.g., the portion that lies within the volume of the first volume image and/or the volume of the second volume image) or along the whole ray, sampling positions (or sampling points) may be determined along the ray. In some embodiments, the determined sampling positions may be equidistant. A sampling position within the volume of the first volume image may correspond to one or more voxels. A sampling position within the volume of the second volume image may correspond to one or more voxels. For example, the first volume image and the second volume image may partially overlap. A sampling position inside the overlapping portion may correspond to one or more first voxels and one or more second voxels at the same time. A sampling position outside the overlapping portion may correspond to one or more first voxels when the sampling position is inside the first volume image, or correspond to one or more second voxels when the sampling position is inside the second volume image. In some embodiments, a sampling position may be located inside a first voxel or a second voxel. In some embodiments, a sampling position may be located between/among one or more first voxels and/or second voxels.

To obtain the fusion data of a ray, a sampling value may be obtained at each of at least some of the sampling positions in the first volume image and/or the second volume image. For example, a first sample value may be obtained at a sampling position based on one or more first voxels corresponding to the sampling position. As another example, a second sample value may be obtained at a sampling position based on one or more second voxels corresponding to the sampling position. The sampling value may be a single value or a vector including multiple elements. When the first/second volume image adopts a color space including multiple color channels (the alpha channel representing the transparency is not treated as a color channel herein), the sampling value may be a vector including elements corresponding to the multiple color channels. For example, for an RGBA color space, the sample value may be a vector including three elements corresponding to the color channels R, G, and B. The fusion data corresponding to the ray may be obtained based on the obtained sampling values.

In some embodiments, the plurality of first/second voxels may be treated as cubes densely packed to form the volume of the first/second volume image. Accordingly, the ray may be viewed as passing through the cubes of the first/second volume image, and each sampling position inside the volume of the first/second volume image may be located inside a first/second voxel. To obtain a first/second sampling value of such a sampling position, the ray casting module 420 may determine a first/second voxel inside which the sampling position is located, and determine the first/second sampling value based on one or more voxel values of the determined first/second voxel. For example, the first/second sampling value may be a vector formed by the voxel values of the first/second voxel corresponding to different color channels.

In some embodiments, the plurality of first/second voxels may be treated as points. In such a situation, a sampling position inside the volume of the first/second volume image may be located between/among different voxels. To obtain a first/second sampling value of such a sampling position, the ray casting module 420 may determine one or more first/second voxels adjacent to the sampling position, and determine the first/second sampling value based on voxel values of the one or more first/second voxels using an interpolation or extrapolation approach. For example, the first/second sampling value may be determined using a trilinear interpolation approach to determine the first/second sampled data based on the voxel values of the one or more first/second voxels.

In some embodiments, one or more of the plurality of sampling positions may be determined outside the volume of the first volume image or the second volume image. Taking a sampling position outside the volume of the second volume image for example, such a sampling position may correspond to no second voxel. Correspondingly, a sampling value (second sampling value) corresponding to that sampling position with respect to the second volume image may be zero. Similarly, for a sampling position outside the volume of the first volume image, a corresponding sampling value (first sampling value) with respect to the first volume image may also be zero.

In some embodiments, for a ray passing through the volume of the second volume image, the ray casting module 420 may determine a reference position and a reference voxel value corresponding to the reference position. The reference position and the reference voxel value may be determined based on voxel values of the first voxels included in the first volume image.

In some embodiments, for a ray passing through the volume of the second volume image, the ray casting module 420 may determine the corresponding pixel value using an alpha blending technique.

In some embodiments, for a ray, voxels of the first volume image and voxels of the second volume image that are along the ray may be selectively used for obtaining the corresponding fusion data. More descriptions of the obtaining of the fusion data for each of the plurality of rays may be found elsewhere in the present disclosure. See, e.g., FIG. 7 and the descriptions thereof.

In 640, the processing device (e.g., the image generation module 430) may generate a fused image based on the fusion data. In some embodiments, for a pixel of the fused image, the image generation module 430 may determine a corresponding pixel value based on the fusion data. Further, based on the plurality of pixels and the corresponding pixels values, the image generation module 430 may generate the fused image. More descriptions of generating the image to be displayed based on the fusion data may be found elsewhere in the present disclosure. See, e.g., FIG. 7 and the descriptions thereof.

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the process 600 may further include an operation for pre-processing (e.g., denoising) the first volume image and the second volume image. As another example, in 620, the processing device 140 may use a volume rendering technique other than MIP to obtain the fusion data.

Figure 7:
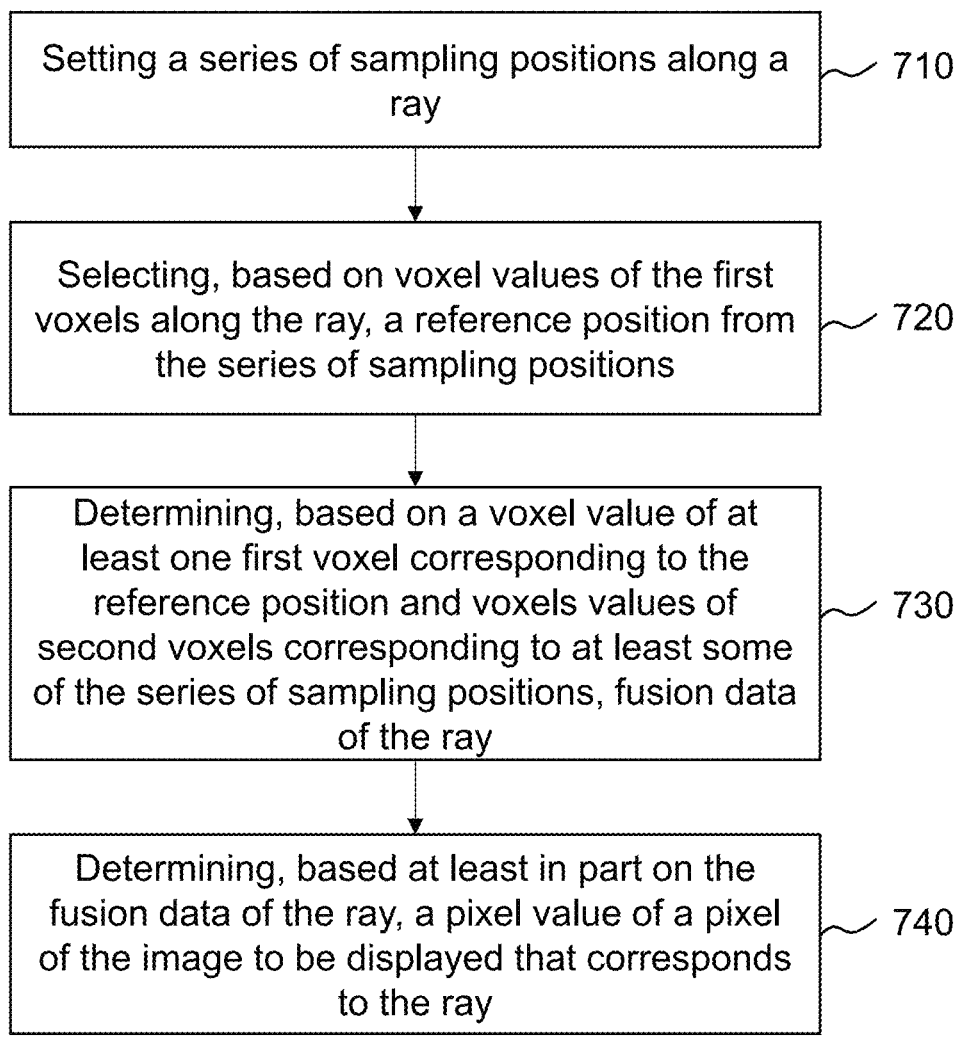
FIG. 7 is a flowchart illustrating an exemplary process for determining a fusion data of a ray according to some embodiments of the present disclosure.

FIG. 7 is a flowchart illustrating an exemplary process 700 for determining fusion data of a ray through the first volume image and/or the second volume image according to some embodiments of the present disclosure. The process 700 may be implemented by the ray casting module 500 illustrated in FIG. 5. In some embodiments, the process 700 illustrated in FIG. 7 may be implemented in the image processing system 100 illustrated in FIG. 1 (e.g., by the processing device 140). For example, the process 700 illustrated in FIG. 7 may be stored in a storage device (e.g., the storage device 150, the storage 220, a ROM, a RAM) in the form of instructions, and invoked and/or executed by one or more processors (e.g., the processor 210) of the processing device 140.

The process 700 may be performed on each of the plurality of rays.

In 710, the processing device 140 (e.g., the sampling position setting unit 510) may set a series of sampling positions (or sampling points) along a ray. The series of sampling positions may be determined from the origin of the ray or from the point (entering point) where the ray enters into the volume of the first/second volume image. The sampling position setting unit 510 may determine the sampling positions along the ray until the end of the ray, to the point (exiting point) where the ray exits the volume, or until a specific count of sampling positions have been determined.

In some embodiments, the sampling position setting unit 510 may determine a sampling interval for the ray. Based on the sampling interval, the series of sampling positions may be equidistantly determined.

In some embodiments, the series of sampling positions may include a start sampling position and an end sampling position. The start sampling position may correspond to the origin of the ray, or the entering point of the ray where the ray enters the volume of the second volume image. The end sampling position may correspond to the end point of the ray, or the exiting point of the ray where the ray exits the volume of the second volume image, or a dynamically determined position where a certain condition is satisfied. For example, the sampling position setting unit 510 may sequentially sample at least one transparency value at each of the series of sampling positions from the start sampling position, and monitor an accumulation of the already obtained transparency values. When the accumulation of the already obtained transparency values reaches a certain threshold (e.g., one), the current sampling position may be dynamically determined as the end sampling position.

In 720, the processing device 140 (e.g., the reference position selection unit 520) may select, based on voxel values of the first voxels along the ray, a reference position from the series of sampling positions.

In some embodiments, the reference position selection unit 520 may first determine a reference voxel. The reference voxel may be the first voxel that has a highest voxel value among the first voxels along the ray. For example, the first voxels included in the first volume image may be determined based on a maximum intensity projection (MIP) technique. For each of the first voxels along the ray, it may have an intensity value. The reference position selection unit 520 may determine a voxel with the highest intensity value among the first voxels along the ray as the reference voxel. In some embodiments, the reference position selection unit 520 may determine a voxel adjacent to (e.g., one or more voxel before or after) the voxel with the highest intensity value among the first voxels along the ray as the reference voxel. In some embodiments, the reference position selection unit 520 may determine an intensity threshold. In some embodiments, the reference position selection unit 520 may determine a voxel along the ray having an intensity value greater than the intensity threshold that appears first along the ray as the reference voxel.

The reference position selection unit 520 may designate the sampling position corresponding to the reference voxel as the reference position. In some embodiments, when the voxels are treated as densely packed cubes, the reference position may be the sampling position inside the reference voxel or where the reference voxel resides. In some embodiments, when the voxels are treated as points, the reference position may be determined based on the position of the reference voxel. For example, the reference position may be the sampling position, among the sampling positions, closest to the reference voxel.

In 730, the processing device 140 (e.g., the fusion data determination unit 530) may determine, based on a voxel value of each of at least one first voxel corresponding to the reference position and voxel values of second voxels corresponding to at least some of the series of sampling positions, fusion data of the ray.

In some embodiments, the voxel value of each first or second voxel may include one or more sub-values. For example, the voxel value may include one or more sub-values representing different colors (e.g., red, green, blue, etc.) of the voxel. The voxel value may also include a sub-value representing the transparency of the voxel. In some embodiments, the voxel value may be represented as a vector including one or more elements. An element may represent a factor of the voxel, such as color, luminance, transparency, or the like, or any combination thereof.

In some embodiments, at the reference position, the fusion data determination unit 530 may obtain a first sampling value based on the voxel value of each of the at least one first voxel corresponding to the reference position. The fusion data determination unit 530 may also obtain, at each sampling position from the start sampling position to the end sampling position, a second sampling value based on the voxel value of each of at least one second voxel corresponding to the sampling position. As a result, a plurality of second sampling values may be obtained. Then based on the at least one first sampling value and the plurality of second sampling values, the fusion data of the ray may be determined.

In some embodiments, as described above, the reference position may be determined based on the MIP technique. When a voxel is treated as a cube, the first/second sampling value may be the voxel value of the first/second voxel inside which the corresponding sampling position is located. When a voxel is treated as a point, the first/second sampling value may be determined based on the voxel values of one or more first/second voxels adjacent to the corresponding sampling position. In some embodiments, the fusion data determination unit 530 may designate a mean of the voxel values of the one or more first/second voxels adjacent to the corresponding sampling position as the first/second sampling value. In some embodiments, the fusion data determination unit 530 may use an interpolation or extrapolation approach (e.g., a trilinear interpolation approach) to obtain the first/second sampling value based on the voxel values of the first/second voxels adjacent to the corresponding sampling position, respectively.

In some embodiments, the fusion data determination unit 530 may first designate the second sampling value of the start sampling position as a first preliminary value. And then the fusion data determination unit 530 may obtain a second preliminary value by updating, for each sampling position from the sampling position next to the start sampling position to the reference position and based at least in part on the second sampling value of the sampling position, the first preliminary value. Further, the fusion data determination unit 530 may obtain a third preliminary value by updating the second preliminary value based on the first sampling value. At last, the fusion data determination unit 530 may obtain the fusion data of the ray by updating, for each sampling position from the sampling position next to the reference position to the end sampling position and based at least in part on the second sampling value of the sampling position, the third preliminary value.

In some embodiments, the obtaining of the second preliminary value by updating, for each sampling position from the sampling position next to the start sampling position to the reference position and based at least in part on the second sampling value of the sampling position, the first preliminary value includes combining a current first preliminary value and the second sampling value using an alpha blending technique. The second preliminary value may include a second preliminary color value and a second preliminary transparency value. For each sampling position from the sampling position next to the start sampling position to the reference position, the second preliminary value including the second preliminary color value and the second preliminary transparency value may be determined according to Equations (1) and (2):

$$C_i^\Delta = (1-A_{i-1}^\Delta)C_i + C_{i-1}^\Delta, \quad (1)$$

and $$A_i^\Delta = (1-A_{i-1}^\Delta)A_i + A_{i-1}^\Delta, \quad (2)$$

where $C_i$ is the color value of the ith sampling position along the ray, $A_i$ is the opacity value of the ith sampling position along the ray, $(1-A_i)$ is the transparency value of the ith sampling position along the ray, $C_i^\Delta$ is the second preliminary color value representing an accumulation of the color value from the first sampling position to the ith sampling position along the ray, and $(1-A_i^\Delta)$ is the second preliminary transparency value representing an accumulation of the transparency value from the first sampling position to the ith sampling position along the ray.

In some embodiments, the obtaining of the third preliminary value by updating the second preliminary value based on the first sampling value includes combining the second preliminary value and the first sampling value using the alpha blending technique. The first sampling value may include a first color sampling value and a first transparency sampling value. The third preliminary value may include a third preliminary color value and the third preliminary transparency value which may be determined according to Equations (3) and (4):

$$C_{i+1}^\Delta = (1-A'_i)C'_i + C_i^\Delta, \quad (3)$$

and $$A_{i+1}^\Delta = (1-A_i^\Delta)A'_i + A_i^\Delta, \quad (4)$$

where $C'_i$ is the first color sampling value at the reference sampling position, $(1-A'_i)$ is the first transparency sampling value at the reference sampling position, $C_i^\Delta$ is the second preliminary color value, $C_{i+1}^\Delta$ is the third preliminary color value, $A_i^\Delta$ is the second preliminary transparency value, and $A_{i+1}^\Delta$ is the third preliminary transparency value.

In some embodiments, the fusion data determination unit 530 may determine the third preliminary value as a weighted sum of the second preliminary value and the first sampling value. The weights of the second preliminary value and the first sampling value may be predetermined. For example, the third preliminary value may include a third preliminary color value and the third preliminary transparency value which may be determined according to Equations (5) and (6):

$$C_{i+1}^\Delta = M_1 C'_i + N_1 C_i^\Delta, \quad (5)$$

and $$A_{i+1}^\Delta = M_2 A'_i + N_2 A_i^\Delta, \quad (6)$$

where $C'_i$ is the first color sampling value at the reference sample position, $C_i^\Delta$ is the second preliminary color value, $C_{i+1}^\Delta$ is the third preliminary color value, $A'_i$ is the first transparency sampling value at reference sample position, $A_i^\Delta$ is the second preliminary transparency value, $(1-A_{i+1}^\Delta)$ is the third preliminary transparency value, and $M_1$, $N_1$, $M_2$, and $N_2$ are predetermined weights of the first color sampling value, the second preliminary color value, first transparency sampling value and the second preliminary transparency value, respectively.

In some embodiments, the obtaining of the fusion data of the ray by updating, for each sampling position from the sampling position next to the reference position to the end sampling position and based at least in part on the second sampling value of the sampling position, the third preliminary value may include combining a current third preliminary value and the second sampling value using the alpha compositing technique. The fusion data of the ray may include a fusion color value and a fusion transparency value of the ray. The determination of the fusion color value and a fusion transparency value may be similar to that of the second preliminary color value and the second preliminary transparency value.

In some embodiments, for each updating operation, a termination condition may be considered. The termination condition may be at least one of the sampling position being outside the volume of the second volume image, or the accumulation of the transparency value reaching a certain threshold (e.g., one), or the sampling position corresponding to the end point of the ray. Once the termination condition is satisfied, the updating process may terminate. For example, if the accumulation of the transparency value reaches a certain threshold (e.g., one) at a sampling position before the reference position, then the operation of obtaining the third preliminary value by updating the second preliminary value based on the first sampling value may be omitted. As another example, if the sampling position corresponding to the exiting point of the ray out of the volume of the second volume image occurs before the reference position, then the operation of obtaining the third preliminary value by updating the second preliminary value based on the first sampling value may be omitted.

In 740, the processing device 140 (e.g., the pixel value determination unit 540) may determine, based at least in part on the fusion data of the ray, a pixel value of a pixel of the fused image that corresponds to the ray.

In some embodiments, the pixel value determination unit 540 may determine the pixel value of the pixel of the image to be displayed based on a volume rendering technique. Exemplary volume rendering techniques may include a ray-casting algorithm, a shear-warp algorithm, a frequency domain algorithm, a splatting algorithm, or the like, or any combination thereof.

In some embodiments, based on the determined pixels and a plurality of parameters (e.g., preset parameters), the pixel value determination unit 540 may generate the image. In some embodiments, the generated image may be displayed on a display device (e.g., the display 320). The plurality of parameters may include image type, image size, image resolution, window width, window level, or the like, or any combination thereof. In some embodiments, the pixel value determination unit 540 may perform a window width adjustment and/or a window level adjustment to adjust the display effect of the image. For example, the displayed image may be a grayscale image of a human body, the pixel value determination unit 540 may perform the window width adjustment to limit a pixel value range of the pixels displayed in the grayscale image, and may perform the window level adjustment to limit the central value of the pixel value range. Thus, the grayscale image may show more details of different tissues of the human body.

It should be noted that the above description of the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in 710, the series of sampling positions along the ray may be determined based on the start sampling position, the end sampling position, and a certain count of sampling positions. As another example, in 720, the processing device 140 may use a volume rendering technique other than MIP (such as, a minimum intensity projection (MinIP) technique, an average intensity projection (AIP) technique, etc.) to determine the reference position.

Figure 8:
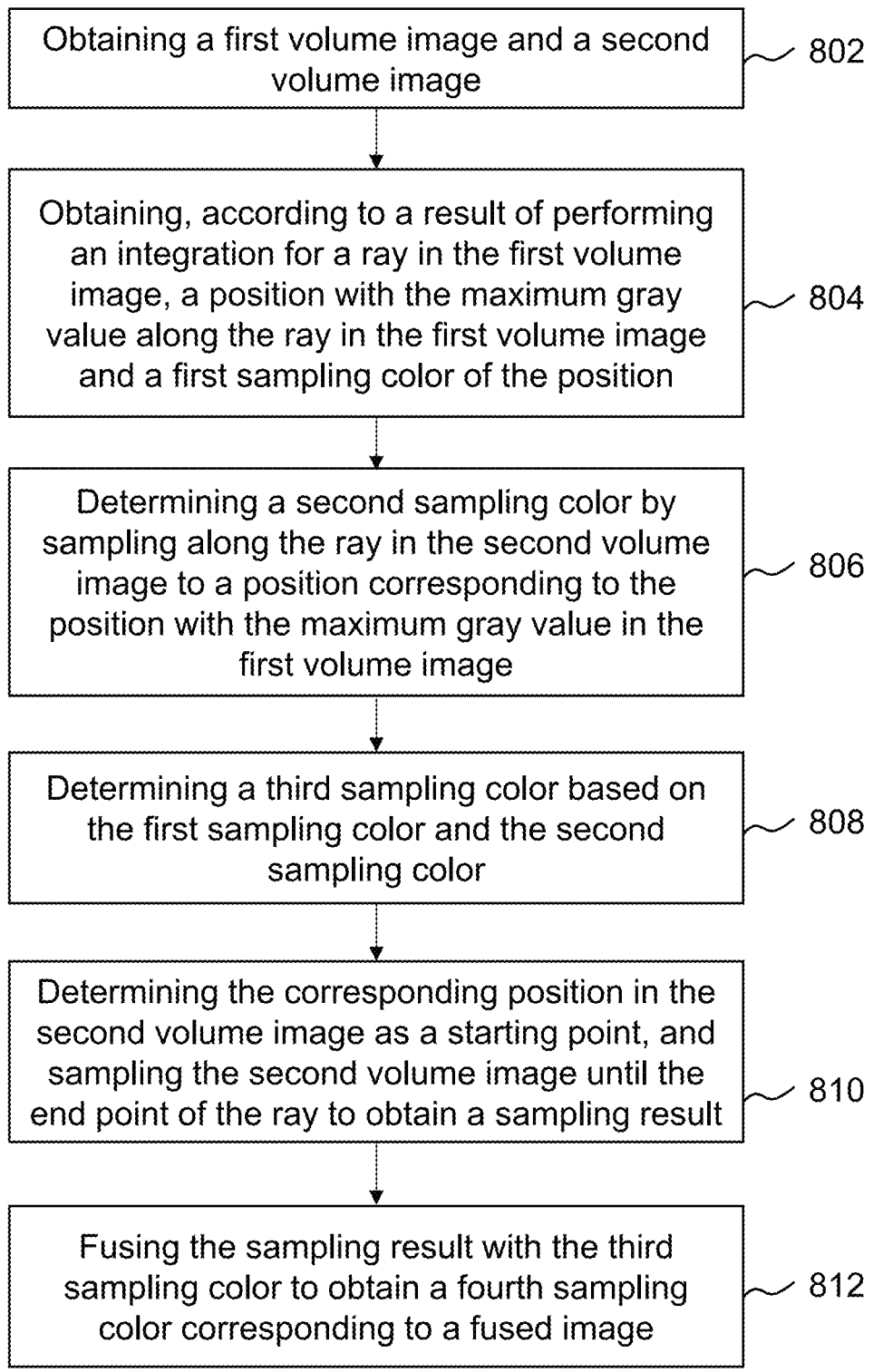
FIG. 8 is a flowchart illustrating an exemplary process for image fusion according to some embodiments of the present disclosure.

FIG. 8 is a flowchart illustrating an exemplary process 800 for image fusion according to some embodiments of the present disclosure. The process 800 may be implemented by the ray casting module 500 illustrated in FIG. 5. In some embodiments, the process 800 illustrated in FIG. 8 may be implemented in the image processing system 100 illustrated in FIG. 1 (e.g., by the processing device 140). For example, the process 800 illustrated in FIG. 8 may be stored in a storage device (e.g., the storage device 150, the storage 220, a ROM, a RAM) in the form of instructions, and invoked and/or executed by one or more processors (e.g., the processor 210) of the processing device 140.

In some embodiments, the operations in process 800 may correspond to or be included in operations that have be described in FIG. 6 and FIG. 7. For example, the operation 802 may correspond to operation 610 in FIG. 6. As another example, the connect of operations 804 to 812 may be found elsewhere in the present disclosure (e.g., FIG. 7 and the descriptions thereof).

In 802, the processing device 140 (e.g., the image acquisition module 410) may obtain a first volume image and a second volume image. The first volume image and the second volume image may be generated by different medical imaging devices. The different medical imaging devices may be preset to scan a same part (e.g., an organ) of a same subject (e.g., a patient). Also, the first volume image and the second volume image corresponding to the same part of the same subject may be obtained from any storage device.

In 804, the processing device 140 (e.g., the ray casting module 420) may obtain, according to a result of performing an integration for a ray in the first volume image, a position with the maximum gray value (corresponding to the reference position mentioned above) along the ray in the first volume image and a first sampling color of the position (corresponding to the first sampling value of the reference position mentioned above).

In 806, the processing device 140 (e.g., the ray casting module 420) may determine a second sampling color (corresponding to the second preliminary value mentioned above) by sampling in the second volume image along the ray until a position corresponding to the position with the maximum gray value in the first volume image (also referred to as "the corresponding position in the second volume image").

In 808, the processing device 140 (e.g., the ray casting module 420) may determine a third sampling color (corresponding to the third preliminary value mentioned above) based on the first sampling color and the second sampling color. In some embodiments, the ray casting module 420 may determine the third sampling color by fusing the first sampling color and the second sampling color.

Specifically, the processing device 140 may position the first volume image and the second volume image to be in a stereo coordinate system. Since a planar image may be formed by connecting a plurality of square pixels, a volume image may be composed of cube-shaped voxels. For a ray passing through a volume image along a path, it may sequentially pass through multiple voxels on the path. Each of the voxels may have its own color.

Based on the above description, the processing device 140 may perform an integration for each of the plurality of rays until the voxel with the maximum gray value in the first volume image, and determine the position of the voxel with the maximum gray value and the first sampling color of the voxel. Further, the processing device 140 may sample in the second volume image until a position which is same as the position of the voxel with the maximum gray value in the first volume image (also referred to as "the corresponding position in the second volume image"), and determine the second sampling color of the voxel at the corresponding position in the second volume image. The processing device 140 may then generate a third sampling color by fusing the first sampling color and the second sampling color when each pair of voxels in the first volume image and the second volume image is fusing. As used herein, a pair of voxels in the first volume image and the second volume image may refer to a first voxel in the first volume image and a second voxel in the second volume image with the same position as the first voxel in the first volume image.

In 810, the processing device 140 (e.g., the ray casting module 420) may determine the corresponding position in the second volume image as a starting point, and sample along the ray that the corresponding position in the second volume image belongs to until the end point of the ray to obtain a sampling result.

In 812, the processing device 140 (e.g., the ray casting module 420) may fuse the sampling result with the third sampling color to obtain a fourth sampling color (corresponding to the fusion data mentioned above) corresponding to a fused image.

Then, the processing device 140 (e.g., the ray casting module 420) may sample each of the voxels after the position with the maximum gray value along the ray in the second volume image one by one. The processing device 140 may fuse the sampling results sequentially with the third sampling color to obtain the fourth sampling color.

That is to say, for any ray passing a same path in the first volume image and the second volume image, the voxels from the position of the start point to the position (corresponding to the reference position) with maximum gray value along the ray may be fused one by one, which can increase the similarity between the color change in the fused image and that of the unfused image(s). The superposition of the color values of the voxels from the position with the maximum gray value may further increase the fineness of image fusion. It is convenient to maintain a correct imaging depth on the basis of fusion, and avoid the situation that the image content is unclear or occluded due to the fusion of voxels in dark positions of the first volume image and the voxels in the light position of the second volume image. It is also convenient to clearly reflect the depth of the first volume image and/or the second volume image after the fusion process, which may ensure that a correct positional relationship between the tissues in the first volume image and tissues in the second volume image can be correctly reflected during various interactive operations, and the accuracy of the fused image can be improved.

In some embodiments, the first volume image and the second volume image may be a maximum intensity projection image and a volume rendering image, respectively. The maximum intensity projection image may be an image generated based on medical imaging perspective and rendering technologies, which may display a projection of the internal tissue structure of the scanned object. The volume rendering image may be an image obtained by continuously superposing color values of voxels during integrating rays.

In related art, if the maximum intensity projection image and the volume rendering image, for example, images of a whole body, are directly fused, the heart, the tumor, and the brain tissue may be obviously displayed in front and shield other portions of the body, the layering may be not clear, and the depth relationship cannot be reflected correctly. By using the technical solution in the present disclosure, after the fusion process, the structure may be clear and portions of the body may not shield each other, and the depth may be correctly reflected, which is convenient for observation and diagnosis.

As another example, if the tumor is under the ribs, directly fusing the maximum intensity projection image and the volume rendering image may cause the tumor to be shielded. By using the technical solution in the present disclosure, after fusing the maximum intensity projection image and the volume rendering image, the depth relationship between the tumor and the ribs may be correct, and the tumor under the ribs may be directly observed.

It can be seen that the technical solution in the present disclosure can be used for the fusion of a maximum intensity projection image of PET and a volume rendering image of CT. It can guarantee that a correct positional relationship between the tissues of the maximum intensity projection image and the volume rendering image may be always correctly reflected during various interaction operations.

In some embodiments, the first volume image and the second volume image may a volume rendering image and a maximum intensity projection image, respectively.

It should be understood that in an actual scenario, the first volume image and the second volume image may also be any other type of volume images other than the volume rendering image and the maximum intensity projection image.

In some embodiments, in 804, the processing device 140 may determine the maximum gray value along the ray of the first volume image according to the result of integrating the ray of the first volume image. Further, the processing device 140 may determine the position corresponding to the maximum gray value along the ray in the first volume image and the corresponding first sampling color.

The determining the maximum gray value along the ray of the first volume image according to the result of integrating the ray of the first volume image may include: traversing all voxels on the ray; determining a voxel corresponding to the maximum gray value according to a result of the traversing. The position and the sampling color of the voxel may be the position where the maximum gray value is located in the first volume image and the corresponding first sampling color.

The color of each voxel in a volume image may be composed of three primary colors of Red (R), Green (G), and Blue (B). According to the comparison of the values of the colors, the voxel with the maximum gray value may be selected as a base point for fusion among all the voxels along the ray. Each voxel may have a corresponding position and a corresponding color.

In 810, the processing device 140 may take the corresponding position as the starting point, and sample in the second volume image in a sampling step along the ray. The fusing the sampling result with the third sampling color to obtain the fourth sampling color corresponding to a fused image, may include fusing sampling results of each sampling step one by one with the third sampling color to obtain the fourth sampling color.

After the operation 808, the sampling color of each voxel from the first voxels next to the position with the maximum gray value along the ray may be determined. The processing device 140 may fuse the sampling colors one by one with the third sampling color to obtain the final fourth sampling color.

Each of the sampling steps may include one or more voxels. If the positions of the first volume image and the second volume image are not corresponding one-to-one, there may be cases of fusing a plurality of voxels of the first volume image and a single voxel of the second volume image, or fusing a single voxel of the first volume image and a plurality of voxels of the second volume image, to meet the actual diagnostic requirement.

FIG. 9 is a flowchart illustrating another exemplary process 900 for image fusion according to some embodiments of the present disclosure.

In 910, in the process for integrating a ray, the processing device 140 (e.g., the ray casting module 420) may first calculate the maximum gray value (denoted as MaxGray), the corresponding position (denoted as MaxStep), and the sampling color (denoted as SampleColor) of the maximum intensity projection.

In 920, for the volume rendering image, the processing device 140 (e.g., the ray casting module 420) may sample from the start point to MaxStep to obtain a sampling color (denoted as vecSampleColor) which may be fused with the SampleColor of the maximum intensity projection. The fusion result may be further assigned to vecSampleColor. The fusion method may be determined according to the following Equations (7) and (8):

$$vecSampleColor^+ = (1.0 - vecSampleColor.a) * sampleColorMIP.rgb \quad (7)$$

$$vecSampleColor.a^+ = sampleColorMIP.a * (1.0 - vecSampleColor.a) \quad (8)$$

In some embodiments, the Equations (7) and (8) may be another expression form of the Equations (1) and (2), wherein (1.0−vecSampleColor.a) represents the transparency value in the second volume image, sampleColorMIP.rgb represents the sampling color value corresponding to the reference position in the first volume image, sampleColorMIP.a represents the transparency value corresponding to the reference position in the first volume image.

In 930, for the volume rendering image, the processing device 140 (e.g., the ray casting module 420) may sample from the position corresponding to the first voxel next to the MaxStep (denoted as MaxStep+1) to the ending position of the ray (denoted as EndStep). The results of each sampling steps may be fused with vecSampleColor, and the fusion result may be assigned as vecSampleColor. That is to say, after the MaxGray, the voxels may be sampled one by one. The fusion method for each sampling step may be determined according to Equations:

$$vecSampleColor.rgb^+ = (1.0 - vecSampleColor.a) * vecGlobalColor.rgb * vecGlobalColor.a \quad (9)$$

and $$vecSampleColor.a^+ = vecGlobalColor.a * (1.0 - vecSampleColor.a) \quad (10)$$

In some embodiments, the Equations (9) and (10) may be another expression form of the Equations (3) and (4), wherein (1.0−vecSampleColor.a) represents the transparency value in the second volume image, vecGlobalColor.rgb represents the sampling color values corresponding to the position after the MaxGray in the second volume image, vecGlobalColor.a represents the transparency values corresponding to the position after the MaxGray in the second volume image.

When the volume rendering image is fused with the maximum density intensity projection image of volume data, the maximum gray value and the position corresponding to the maximum gray value of the maximum intensity projection on each of the rays may be first determined during the ray casting process. Then, an accumulation along the ray may be performed on the volume rendering image. When the integration of each of the rays reaches the position with the maximum gray value in the maximum intensity projection, the sampling color at this time may be fused with the sampling color of the maximum intensity projection. Further, the integration of the ray may be continued until the end. The final display results may reflect the depth relationship between the volume data correctly.

Figure 10:
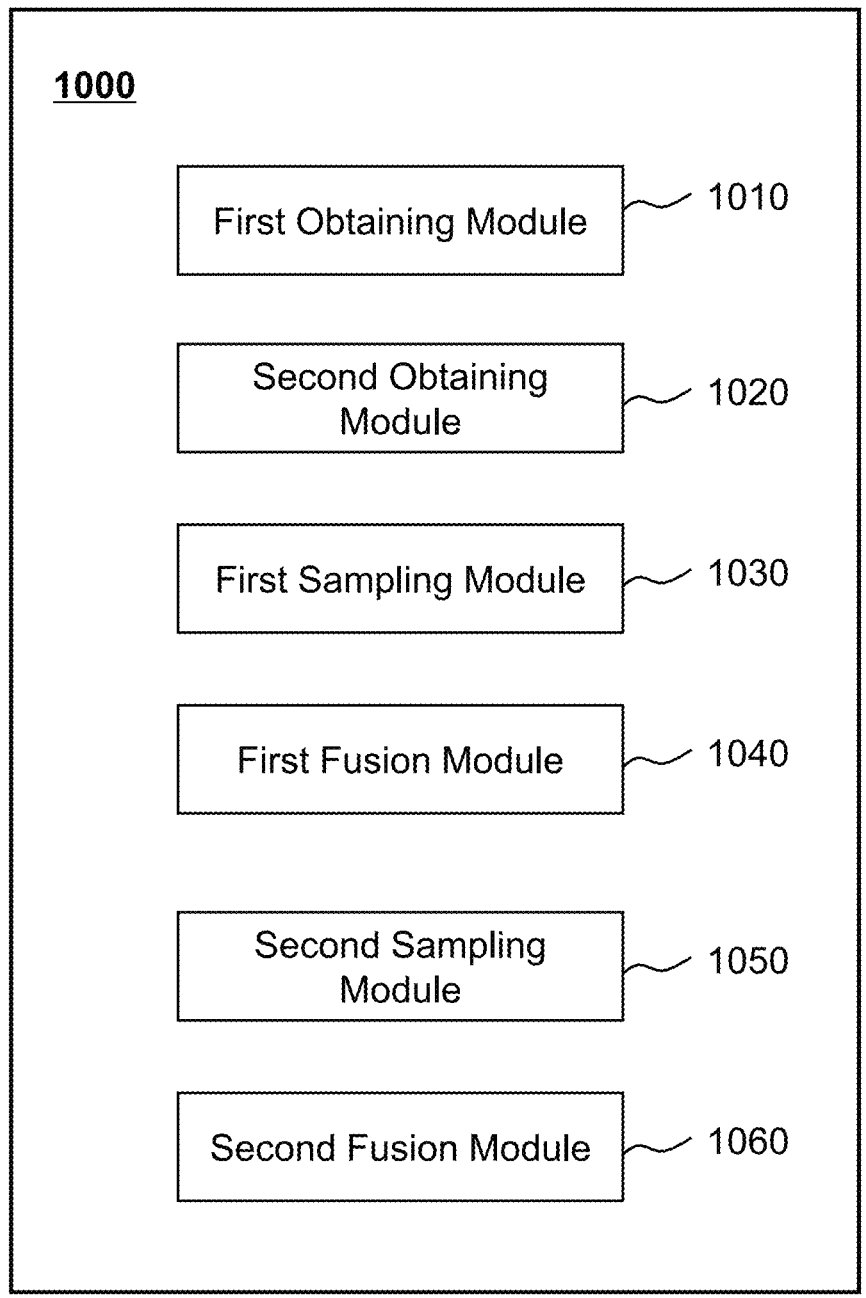
FIG. 10 is a block diagram illustrating an exemplary image fusion system according to some embodiments of the present disclosure.

FIG. 10 is a block diagram illustrating an exemplary image fusion system 1000 according to some embodiments of the present disclosure. As shown in FIG. 10, the image fusion system 1000 may include a first obtaining module 1010, a second obtaining module 1020, a first sampling module 1030, a first fusion module 1040, a second sampling module 1050 and a second sampling module 1060. The first obtaining module 1010 may be configured to obtain the first volume image and the second volume image. The second obtaining module 1020 may be configured to obtain, according to a result of integrating a ray in the first volume image, a position with the maximum gray value of the first volume image and a first sampling color thereof. The first sampling module 1030 may be configured to determine the second sampling color by sampling along the ray in the second volume image to a position corresponding to the position with the maximum gray value in the first volume image. The first fusion module 1040 may be configured to determine a third sampling color based on the first sampling color and the second sampling color. The second sampling module 1050 may be configured to determine the corresponding position in the second volume image as a starting point, and sample the second volume image to the end point of the ray to obtain a sampling result. The second sampling module 1060 may be configured to fuse the sampling result with the third sampling color to obtain a fourth sampling color corresponding to the fused image The image fusion system 1000 may use the solutions described in any of the embodiments shown in FIGS. 1 to 9. Therefore, it has all the technical effects described above, and the details are not described herein again.

In some embodiments, the first volume image and the second volume image may be a MIP image and a volume rendering image, respectively.

In some embodiments, the second obtaining module 1020 may be configured to determine the maximum gray value of the first volume image according to the result of integrating a ray in the first volume image, and determine the position with the maximum gray value along the ray in the first volume image and the corresponding first sampling color.

In some embodiments, optionally, the second obtaining module 1020 may be configured to traverse all voxels along the ray and determine the voxel corresponding to the maximum gray value according to a result of the traversing. The position and the sampling color of the voxel may be the position where the maximum gray value is located in the first volume image and the corresponding first sampling color.

In some embodiments, optionally, the second sampling module 1050 may be configured to take the corresponding position as the starting point, and sample in a sampling step along the ray in the second volume image. The fusing of the sampling result with the third sampling color to obtain the fourth sampling color corresponding to the fused image may include fusing sampling results of each sampling step one by one with the third sampling color.

In some embodiments, optionally, each sampling step may include more than zero voxel.

Figure 11:
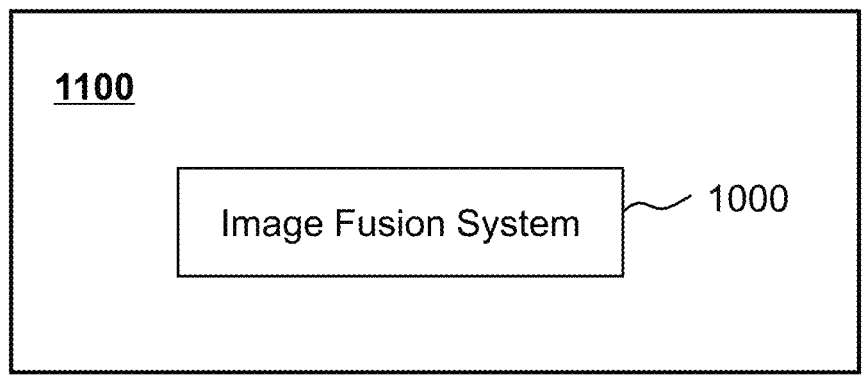
FIG. 11 is a block diagram illustrating an exemplary medical equipment according to some embodiments of the present disclosure

FIG. 11 is a block diagram illustrating an exemplary medical equipment 1100 according to some embodiments of the present disclosure. As shown in FIG. 11, the medical equipment 1100 include the image fusion system 1000 described in FIG. 10. Therefore, the medical equipment 1100 may realize the same technical effects as the image fusion system 1000 described in FIG. 10, and whose details are not repeated here.

In addition, according to some embodiments of the present disclosure, an image fusion terminal is provided. The image fusion terminal may include a processor and a memory. The memory may be configured to store instructions. When the instructions are executed by the processor, the image fusion terminal may be caused to implement the method as described in the embodiments in FIG. 8.

Figures 12A, 12B:
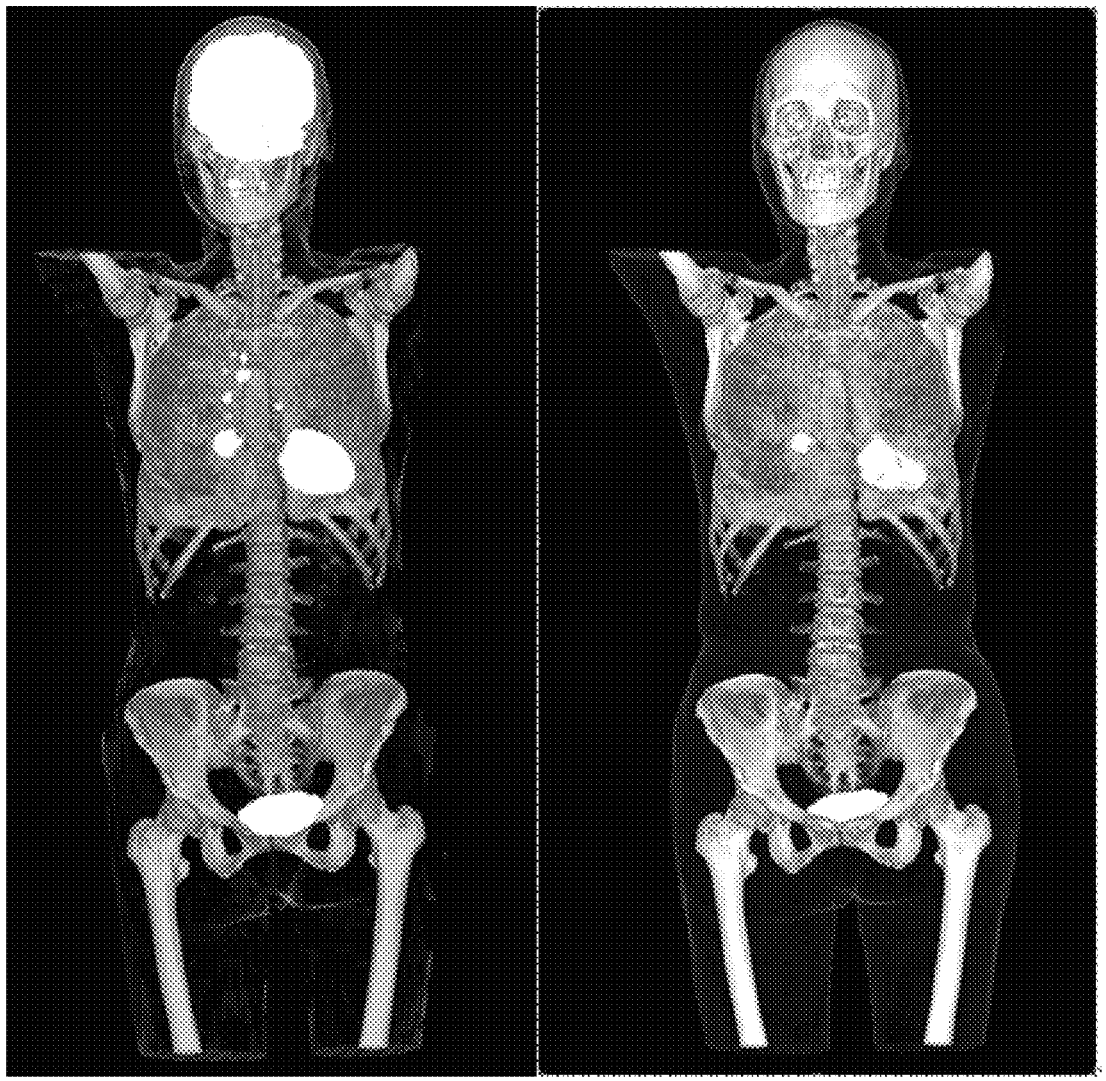
FIG. 12a and FIG. 12b are fusion images generated based on volume rendering and MIP techniques according to some embodiments of the present disclosure.

FIG. 12a and FIG. 12b are fusion images generated based on volume rendering and MIP techniques according to some embodiments of the present disclosure. In FIG. 12a, a first CT image was determined using a volume rendering technique and a second PET image using an MIP technique. The first CT image and the second PET image may include image regions corresponding to a same patient. For each of the pixels in the first CT image in the image regions corresponding to the same patient, it may have a corresponding pixel in the second PET image. Pixels in the first CT image and the corresponding pixels in the second PET image were directly fused to obtain the pixel values of fused pixels and further generated the fusion image, which is shown in the FIG. 12a. As a result, the organs (e.g., heart), the tissue (e.g., brain tissue), and/or a lesion (e.g., a tumor) of the patient may be exposed outside the body, which does not reflect a correct depth relationship. In FIG. 12b, a fusion image was generated using the fusion techniques described in the present disclosure. A pixel of the fusion image may be determined based on the CT image volume data and the PET volume data. As a result, the organs (e.g., heart), the tissue (e.g., brain tissue) and/or a lesion (e.g., a tumor) may be obscured by bones of the patient, which reflect the correct depth relationship.

Figures 13A, 13B:
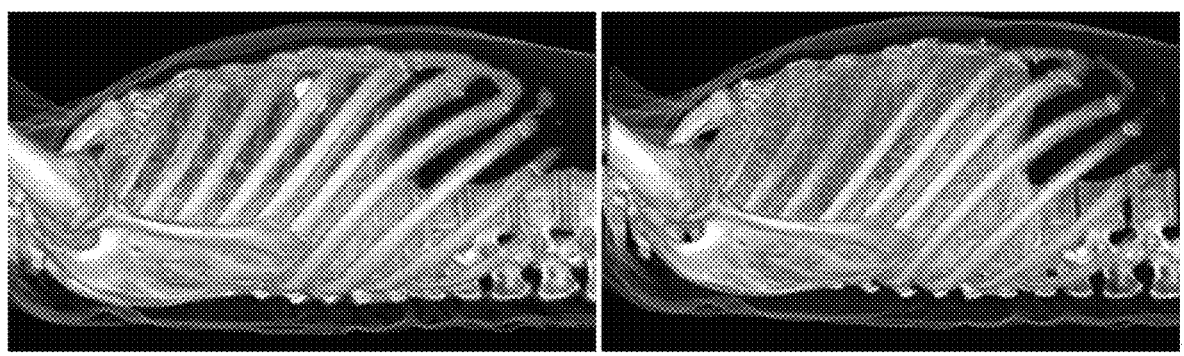
FIG. 13a and FIG. 13b are fusion images with different window widths and/or window levels according to some embodiments of the present disclosure.

FIG. 13a and FIG. 13b are fusion images with different window widths and/or window levels according to some embodiments of the present disclosure. As shown in the in FIG. 13a, the tumor was observed through the gap between the ribs of the patient. While in FIG. 13b, the tumor was blocked due to the adjustment of the window width and/or the window level on the fusion data. In other words, the adjustment of window width and/or the window level may relate to a field of view (FOV) and the depth of an observation. A proper adjustment of window width and/or the window level may lead to a desired observation.

Figure 14:
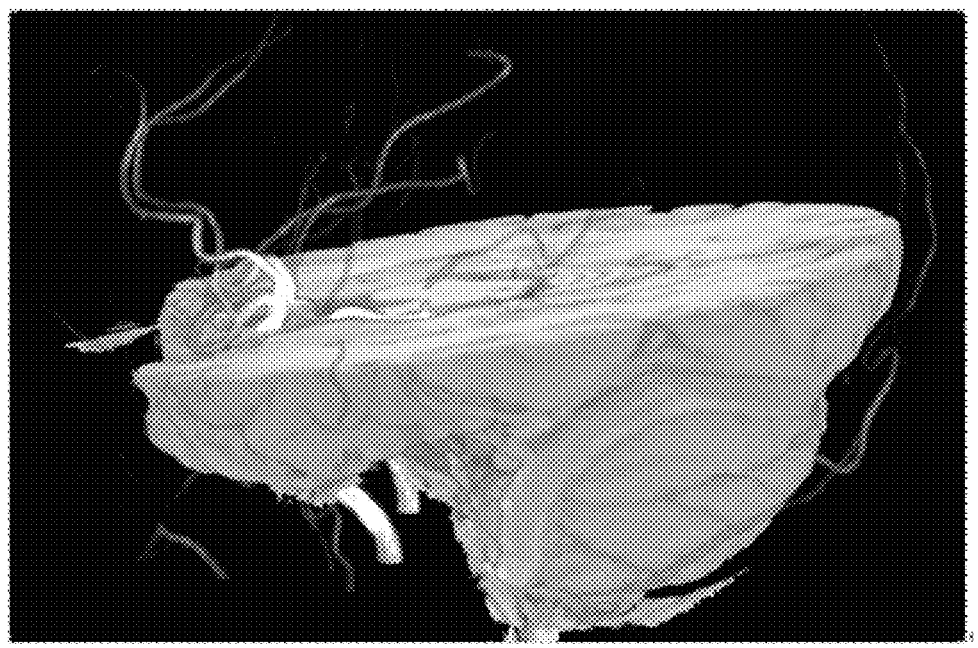
FIG. 14 is a fusion image according to some embodiments of the present disclosure.

FIG. 14 is a fusion image according to some embodiments of the present disclosure. The fusion image was generated by fusing a 3D MR scalp anatomical image and a 3D MR time of flight (TOF) angiography image. The scalp anatomical image was a 3D MR image generated using a volume rendering technique. The TOF angiography image was a 3D MR image generated using an MIP technique. As shown in the fusion image in FIG. 14, the nerves and the vessels are wrapped in the brain tissue, which reflects the correct depth relationship.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method, implemented on a machine including at least one processor and at least one storage device, the method comprising:
    obtaining a first volume image and a second volume image;
    obtaining, based on a result of performing an integration for a first ray in the first volume image, a first position with a maximum gray value along the first ray in the first volume image and a first sampling color of the first position;
    determine a second sampling color by sampling a second position in the second volume image corresponding to the first position with the maximum gray value in the first volume image;
    determining a third sampling color based on the first sampling color and the second sampling color;
    sampling the second volume image along a second ray from a starting point until an end point of the second ray to obtain a sampling result, the starting point being determined by the second position in the second volume image corresponding to the first position; and
    fusing the sampling result with the third sampling color to obtain a fourth sampling color corresponding to a fused image.

2. The method of claim 1, wherein
    the first volume image is a maximum intensity projection image, and
    the second volume image is a volume rendering image.

3. The method of claim 1, wherein the obtaining, based on a result of performing an integration for a first ray in the first volume image, a first position with a maximum gray value along the first ray in the first volume image and a first sampling color of the first position comprises:
    determining the maximum gray value along the first ray of the first volume image based on the result of performing an integration for the first ray of the first volume image; and
    determining the first position corresponding to the maximum gray value along the first ray in the first volume image and the first sampling color corresponding to the first position.

4. The method of claim 3, wherein the determining the maximum gray value along the first ray of the first volume image based on the result of performing an integration for the first ray of the first volume image comprises:
    traversing all voxels on the first ray; and
    determining a voxel corresponding to the maximum gray value along the first ray based on the result of the traversing.

5. The method of claim 4, wherein the position of the voxel corresponding to the maximum gray value along the first ray is the first position that the maximum gray value along the first ray is located in the first volume image and the sampling color of the voxel corresponding to the maximum gray value along the first ray is the first sampling color corresponding to the first position.

6. The method of claim 1, wherein the sampling the second volume image along the second ray that a starting point is located from the starting point until an end point of the second ray to obtain a sampling result comprises:
    sampling the second volume image in a sampling step along the second ray from the starting point until an end point of the second ray.

7. The method of claim 6, wherein each the sampling step includes one or more voxels.

8. The method of claim 1, wherein the fusing the sampling result with the third sampling color to obtain a fourth sampling color corresponding to a fused image comprises:
    fusing the sampling results of each sampling step one by one with the third sampling color to obtain the fourth sampling color.

9. The method of claim 1, further comprising:
  determining the sampling color of each of the voxels after the second position with a maximum gray value along the second ray in the second volume image one by one; and
  fusing the sampling color of each of the voxels one by one with the third sampling color to obtain the fourth sampling color.

10. A system, comprising:
  at least one storage medium including a set of instructions;
  at least one processor in communication with the at least one storage medium, wherein when executing the set of instructions, the at least one processor is directed to cause the system to perform operations including:
    obtaining a first volume image and a second volume image;
    obtaining, based on a result of performing an integration for a first ray in the first volume image, a first position with a maximum gray value along the first ray in the first volume image and a first sampling color of the first position;
    determine a second sampling color by sampling a second position in the second volume image corresponding to the first position with the maximum gray value in the first volume image;
    determining a third sampling color based on the first sampling color and the second sampling color;
    sampling the second volume image along a second ray that a starting point is located from the starting point until an end point of the second ray to obtain a sampling result, the starting point being determined by the second position in the second volume image corresponding to the first position; and
    fusing the sampling result with the third sampling color to obtain a fourth sampling color corresponding to a fused image.

11. The system of claim 10, wherein the first volume image is a maximum intensity projection image and the second volume image is a volume rendering image.

12. The system of claim 10, wherein to obtain, based on a result of performing an integration for a first ray in the first volume image, a first position with a maximum gray value along the first ray in the first volume image and a first sampling color of the first position, the at least one processor is directed to cause the system to perform additional operations including:
  determining the maximum gray value along the first ray of the first volume image based on the result of performing an integration for the first ray of the first volume image; and
  determining the first position corresponding to the maximum gray value along the first ray in the first volume image and the corresponding first sampling color.

13. The system of claim 12, wherein to determine the maximum gray value along the first ray of the first volume image based on the result of performing an integration for the first ray of the first volume image, the at least one processor is directed to cause the system to perform additional operations including:
  traversing all voxels on the first ray; and
  determining a corresponded voxel corresponding to the maximum gray value along the first ray based on the result of the traversing.

14. The system of claim 13, wherein the position of the corresponded voxel is the first position that the maximum gray value along the first ray is located in the first volume image and the sampling color of the corresponded voxel is the corresponding first sampling color.

15. The system of claim 10, wherein to sample the second volume image along the second ray that a starting point is located from the starting point until an end point of the second ray to obtain a sampling result, the at least one processor is directed to cause the system to perform additional operations including:
  sampling the second volume image in a sampling step along the second ray from the starting point until an end point of the second ray.

16. The system of claim 15, wherein each the sampling step includes one or more voxels.

17. The system of claim 10, wherein to fusing the sampling result with the third sampling color to obtain a fourth sampling color corresponding to a fused image, the at least one processor is directed to cause the system to perform additional operations including:
  fusing the sampling results of each sampling step one by one with the third sampling color to obtain the fourth sampling color.

18. The system of claim 10, wherein the at least one processor is directed to cause the system to perform additional operations including:
  determining the sampling color of each of the voxels after the second position with a maximum gray value along the second ray in the second volume image one by one; and
  fusing the sampling color of each voxel one by one with the third sampling color to obtain the fourth sampling color.

19. A non-transitory computer readable medium storing instructions, the instructions, when executed by at least one processor, causing the at least one processor to implement a method comprising:
  obtaining a first volume image and a second volume image;
  obtaining, based on a result of performing an integration for a first ray in the first volume image, a first position with a maximum gray value along the first ray in the first volume image and a first sampling color of the first position;
  determine a second sampling color by sampling a second position in the second volume image corresponding to the first position with the maximum gray value in the first volume image;
  determining a third sampling color based on the first sampling color and the second sampling color;
  sampling the second volume image along a second ray that a starting point is located from the starting point until an end point of the second ray to obtain a sampling result, the starting point being determined by a second position in the second volume image corresponding to the first position; and
  fusing the sampling result with the third sampling color to obtain a fourth sampling color corresponding to a fused image.

20. The non-transitory computer readable medium of claim 19, when executed by at least one processor, causing the at least one processor to implement a method comprising:
  determining the maximum gray value along the first ray of the first volume image based on the result of performing an integration for the first ray of the first volume image; and determining the first position corresponding to the maximum gray value along the first ray in the first volume image and the corresponding first sampling color.

\* \* \* \* \*